United States Patent [19]

Engström

[11] Patent Number: 5,527,217

[45] Date of Patent: Jun. 18, 1996

[54] ADJUSTABLE DEVICE FOR EXHAUSTION AND/OR SUPPLY OF GAS

[75] Inventor: Hans T. Engström, Helsingborg, Sweden

[73] Assignee: AB Ph. Nederman & Co., Helsingborg, Sweden

[21] Appl. No.: 416,509

[22] Filed: Apr. 3, 1995

Related U.S. Application Data

[63] Continuation of Ser. No. 199,246, filed as PCT/SE92/00566, Aug. 21, 1992, abandoned.

[30] Foreign Application Priority Data

Aug. 26, 1991 [SE] Sweden .................. 9102441-4

[51] Int. Cl.⁶ .................................................. B08B 15/04
[52] U.S. Cl. ............................................ 454/63; 454/65
[58] Field of Search ............................ 454/63, 65, 254, 454/284, 306, 338

[56] References Cited

U.S. PATENT DOCUMENTS 3,820,752  6/1974  Oram .
4,682,749  7/1987  Strater .
4,699,046  10/1987  Bellieni ..................... 454/65
4,860,644  8/1989  Kohl et al. .

FOREIGN PATENT DOCUMENTS 2525930  11/1983  France ..................... 454/65
3004392  8/1981  Germany ................... 454/65

Primary Examiner—Harold Joyce
Attorney, Agent, or Firm—Bacon & Thomas

[57] ABSTRACT

An adjustable device for exhaustion and/or supply of gases and gas supported particles, the device comprising at least one exhaustion and/or supply conduit which is pivotable in at least a vertical direction, whereby at least one force-producing balancing device is provided for balancing the exhaustion and/or supply conduit. In order to provide at such an adjustable device that the balancing device generates balancing forces which correspond with the correct balancing requirement, the force-producing balancing device cooperates with a compensating device which compensates for the differences between the balancing force that the force-producing balancing device exerts on the exhaustion and/or supply conduit and the force required for balancing the exhaustion and/or supply conduit in substantially all its positions.

53 Claims, 20 Drawing Sheets

ADJUSTABLE DEVICE FOR EXHAUSTION AND/OR SUPPLY OF GAS

This application is a continuation of application Ser. No. 08/199,246, filed as PCT/SE92/00566, Aug. 21, 1992, now abandoned.

BACKGROUND OF THE INVENTION

The present invention relates to an adjustable device for exhaustion and/or supply of gases and gas supported particles, said device comprising at least one exhaustion and/or supply conduit which is pivotable in at least vertical direction, whereby a force producing balancing device is provided for balancing the exhaustion and/or supply conduit.

U.S. Pat. No. 3,818,817 relates to an adjustable device for exhaustion of fumes from working places. This device comprises an exhausting conduit which is adjustable in vertical direction for setting thereof in various operating positions. A force producing device in the shape of tension springs is provided to balance the exhausting conduit such that it maintains the positions set.

A problem with this and other balancing devices for adjustable devices of said type is that said balancing devices do not produce balanced forces corresponding with the actual balancing need. This means that one must use friction links which provide sufficient friction for maintaining the conduit in all positions set. A drawback with friction links providing sufficient friction for maintaining the conduit in said positions is however, that a large frictional effect must be overcome when the conduit is pivoted in vertical direction, which means that it is heavy to manipulate.

The object of the present invention is among other things to ensure that in adjustable devices of the abovementioned type, the balancing device produce balanced forces which correspond with the correct balancing need. This is arrived at according to the invention by providing the abovementioned device with the characterizing features of claim 1.

By means of said characterizing features an easily controllable conduit is provided, which maintains substantially all its set positions without needing friction links therefor, producing great friction forces for this maintenance.

BRIEF DESCRIPTION OF THE DRAWINGS

The invention will be further described below with reference to the accompanying drawings, wherein.

DESCRIPTION OF THE PREFERRED EMBODIMENTS

Figure 1:
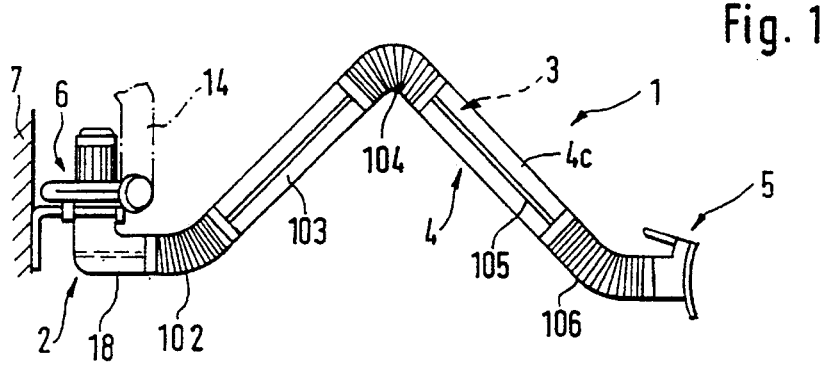
FIG. 1 is a side view of an adjustable device according to the invention having two adjustable conduit members.

The adjustable device 1 illustrated in the drawings is at first hand adapted for exhaustion of gases and gas supported particles from work places, e.g. air contaminated with unhealthy welding fume generated at work places for welding. The adjustable device 1 consists of an exhausting conduit 4 having a first conduit member 4a, a second conduit member 4b and a passage 4c for gas transport. The exhaustion conduit 4 is adjustable for setting in suitable position relative to the place or spot where contaminants and/or other particles are generated, such that these can be exhausted before spreading. The exhausting conduit 4 is also adjustable in such a way that its position can be altered from one place to another for e.g. successive movements during progress of welding or other work.

The exhausting conduit 4 includes, in the embodiment shown, a link device 2 (so called swivel device), a support arm 3 provided on the link device 2 and a hood 5, all constituting the outer members of the exhausting conduit 4.

The link device 2 is adapted to permit pivoting of the exhausting conduit 4 in horizontal direction in parts of a turn or more. The exhausting conduit 4 is pivotable in vertical direction such that the hood 5 can be set in various heights and/or at various distances e.g. from the link device 2. The hood 5 is adapted to facilitate effective collection of gas to be exhausted.

Figure 10:
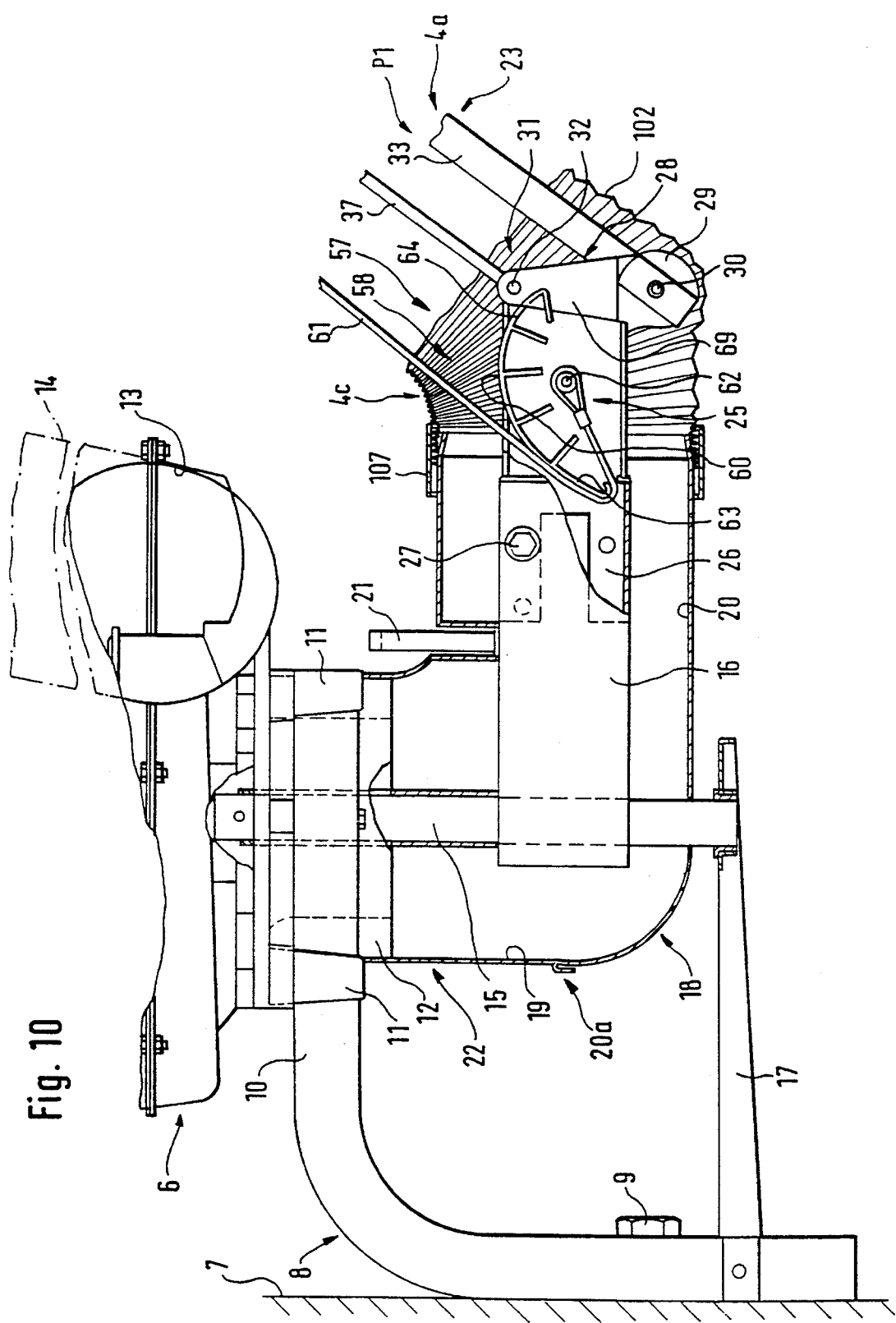
FIG. 10 is a side view of holding and coupling members forming part of the adjustable device, whereby obscuring members have been removed for being able to see into said members.
Figure 11:
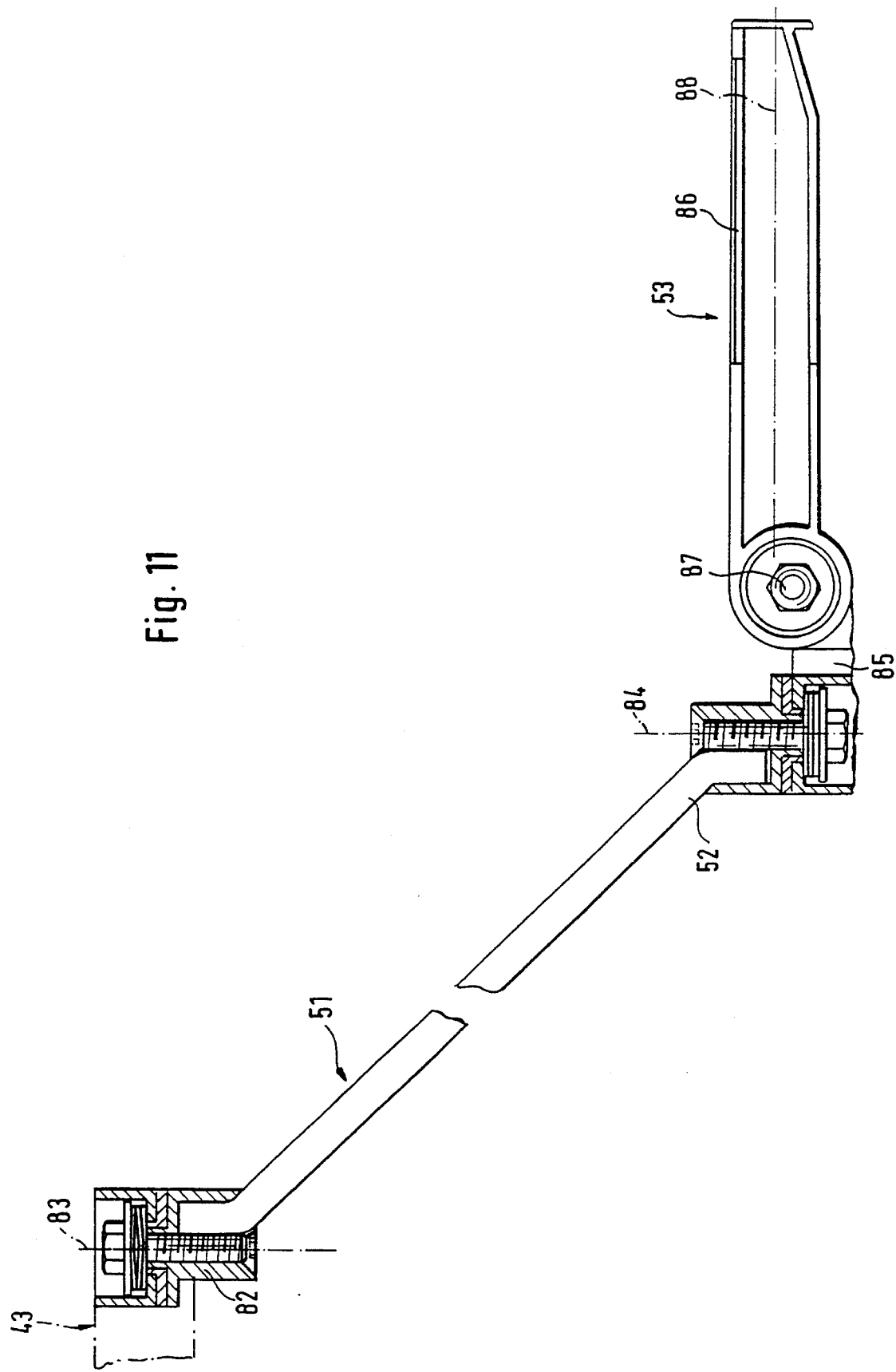
FIG. 11 is a side view of an outer arm forming part of the adjustable device.
Figure 12:
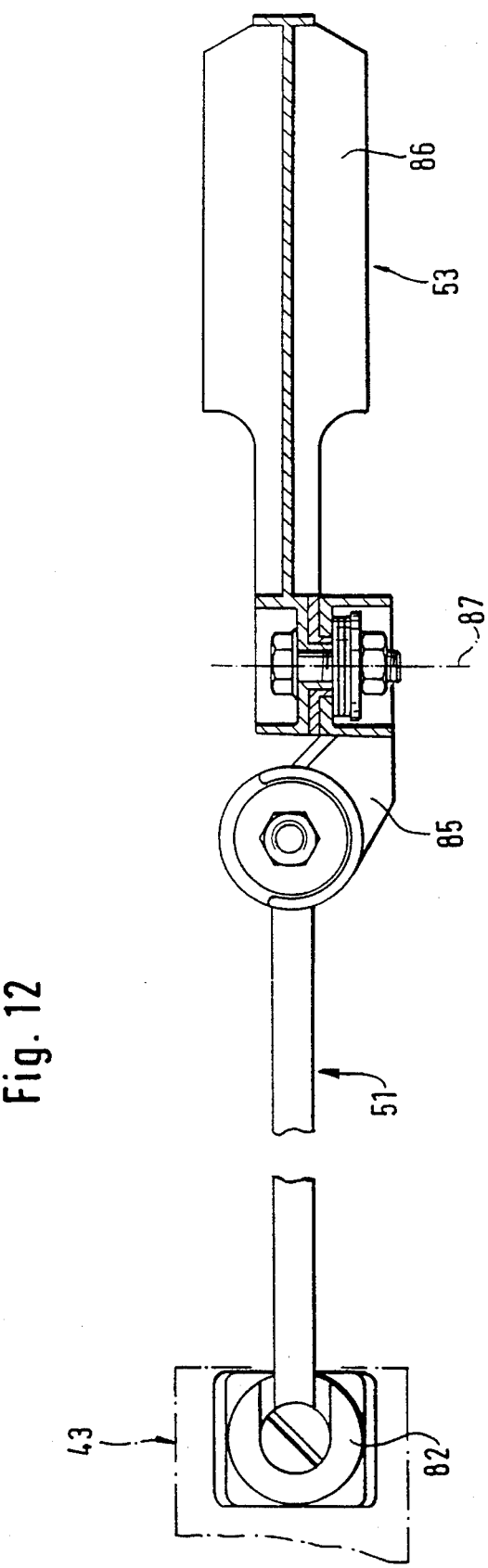
FIG. 12 is a plan view of the outer arm of FIG. 11.
Figure 13:
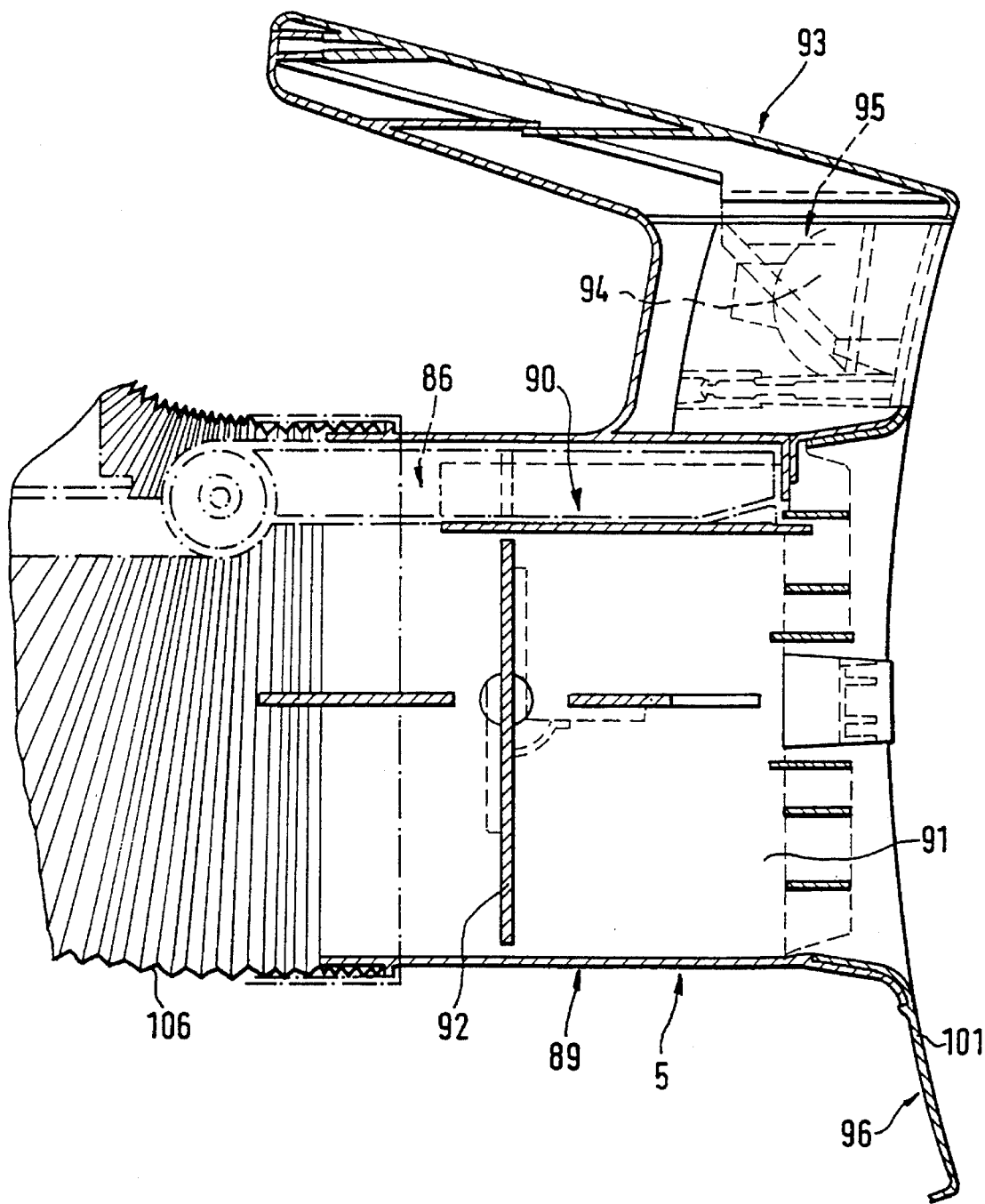
FIG. 13 is a vertical section through a suction hood forming part of the adjustable device.
Figure 14:
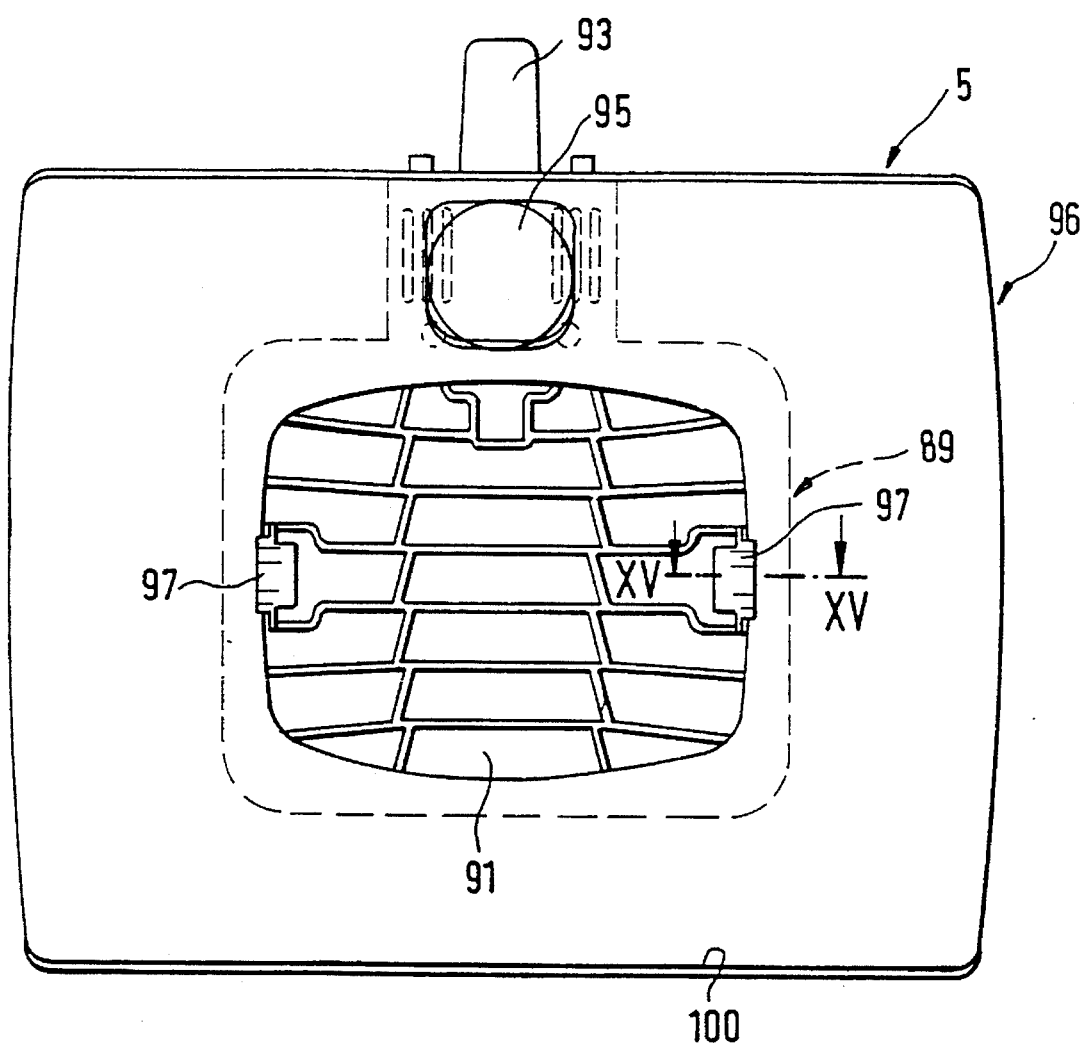
FIG. 14 is a front view of the suction hood of FIG. 13.

At the embodiment shown, the link device 2 is mounted on a cantilever 8 (see FIG. 10) which is screwed onto the wall 7 through suitable firing means 9 and it has shanks 10 directed outwardly from the wall 7. The link device 2 comprises yokes 11 permitting said device 2 to be threaded onto the shanks 10, whereafter said device 2 can be fixed to said shanks 10 by means of suitable fixing means (not shown).

A fan aggregate 6 or another evacuating unit can be mounted on the link device 2 and is designed such that the exhausting conduit attains the required suction effect. The air is suck into the fan aggregate 6 through a lower tubular air inlet 12 and it is discharged through a sidewardly directed air outer 13 and guided out from the premises through a hose 14 connected to said outlet.

The link device 2 comprises a vertically directed link shaft 15 and a bracket 16 attached thereto and horizontally directed and having the shape of a square tube. The link shaft 15 is at the top pivotally mounted in the link device 2. If the load on the link shaft 15 is great, said shaft is preferably pivotally mounted in a support means 17 which is fixedly mounted on the cantilever 8.

The link device 2 further comprises a gas passage 18 formed by an upper and a lower passage portion 19, 20. The upper portion 19 of the air passage 18 is through a connecting means 21 of a suitable type attached to the bracket 16 such that said gas passage 18 is moved along with said bracket during rotation thereof. The upper passage portion 19 has a tubular upper member 22 fitting the outside of an air inlet provided on the link device 2 such that it pivotally connects thereto. The lower passage portion 20 can be threaded onto the link shaft 15 and it can be snapped onto the upper passage portion 19 while said passage portions 19, 20 are provided with snap portion 20a. These are preferably formed such that they provide sealing between the passage portions 19, 20.

The vertically pivotable carrier or support arm 3 consists of a first and a second arm 23, 24 of which the first arm 23 is mounted on the link device 2 while the second arm 24 is mounted on the outer portions of said first arm 23. The first arm 23 is mounted on the link device 2 through a rear link means 25. For this purpose the rear link means 25 has a fixing portion 26 which can be inserted into the bracket 16 and attached thereto by means of bolts 27 or similar fixing means. The link means 25 further comprises a link portion 28 located at a distance outside the bracket 16. The link portion 28 has a lower link 29 with a horizontal link shaft 30 which preferably is provided somewhat above an extension of the lower edge of the air passage 18. The link portion 28 further has an upper link 31 with a horizontal link shaft 32.

In the lower link 29 a pivoting arm 33 is pivotally mounted about the horizontal link shaft 30 in such manner that said pivoting arm can be swung or pivoted in vertical direction. On the outer end of the pivoting arm 33 there is provided an intermediate link means 34, through a lower link 35 with a horizontal link shaft 36, in such a way that the intermediate link means 34 can pivot in vertical direction relative to the pivoting arm 33. In the upper link 31, about the horizontal link shaft 32, there is pivotally mounted a parallel guide bar 37 in such manner that said bar can pivot in vertical direction. The outer end of the parallel guide bar 37 is pivotally mounted on an upper link 38 on the intermediate link means 34 in such manner that said bar can swing or pivot about a horizontal link shaft 39.

By means of the pivoting arm 33 and the parallel guide bar 37 a portion P1 of a parallelogram device is obtained, which permits movement of the intermediate link means 34 with maintained positional orientation relative to the horizontal plane when the first conduit member 23 is pivoted in vertical direction.

The second arm 24 is mounted on the intermediate link means 34 such that also said arm can pivot in vertical direction. For mounting the second arm 24 the intermediate link means 34 comprises a second lower link 40 with a horizontal link shaft 41 about which a pivoting arm 42 is pivotally mounted in vertical direction. On the outer end of the pivoting arm 42 there is provided an outer link means 43, through a lower link 44, in such a way that said outer link means can pivot in vertical direction relative to the pivoting arm 42 about a horizontal shaft 45.

The intermediate link means 34 also comprises a second upper link 46 wherein, about a horizontal link shaft 47, a parallel guide bar 48 is pivotally mounted in such manner that said bar can pivot in vertical direction. The outer end of the parallel guide bar 48 is pivotally mounted on an upper link 49 on the outer link means 43 in such a way that said bar can pivot about a horizontal link shaft 50.

By means of the pivoting arm 43 and the parallel guide bar 48 a portion P2 of the parallelogram device is obtained, which permits movement of the outer link means 43 with maintained positional orientation relative to the horizontal plane when the second arm 24 is pivoted in vertical direction.

An outer arm 51 can be provided on the outer link means 43, said arm being directed obliquely downwards and in an outer end portion 52 provided with a bracket 43 for the hood 5.

The passage 4c is connected with the hood 5 and with the gas passage 18 of the link device 2 for conducting or transporting gases from said hood 5 to said gas passage 18 and therethrough to the fan aggregate 6 or any other evacuating unit. In the embodiment shown, this passage 4c surrounds the various members of the first and second arms 23, 24. The passage 4c is provided in a special way and includes special parts which will be described below.

For balancing the exhausting conduit 4 there is provided at least one force producing balancing device 54. This device consists of, at the device 1 shown, a first spirally wounded tension spring 55 for balancing the first arm 23 and members supported thereby and a second spirally wounded tension spring 56 for balancing the second arm 24 and members supported thereby.

The force producing balancing device 54 cooperates with a compensating device 57 for compensation of differences between the balancing force applied onto the support arm 3 by said balancing device and the force required for balancing said support arm 3. Hereby, it is achieved that the support arm 3 in substantially all of its positions is almost completely balanced without using frictional links or without taking other additional measures for that purpose.

In the embodiment shown, the compensating device 57 compensates differences between the force requirement of the parallelogram-device portions P1, P2 and the characteristic of the tension springs 55, 56. Hereby, the compensating device comprises a first compensating means 58 for cooperation with the first tension spring 55 and a second compensating means 59 for cooperation with the tension spring 56. The first compensating means 58 is mounted on the rear link means 25 and forms a compensating curve 60.

Figure 5:
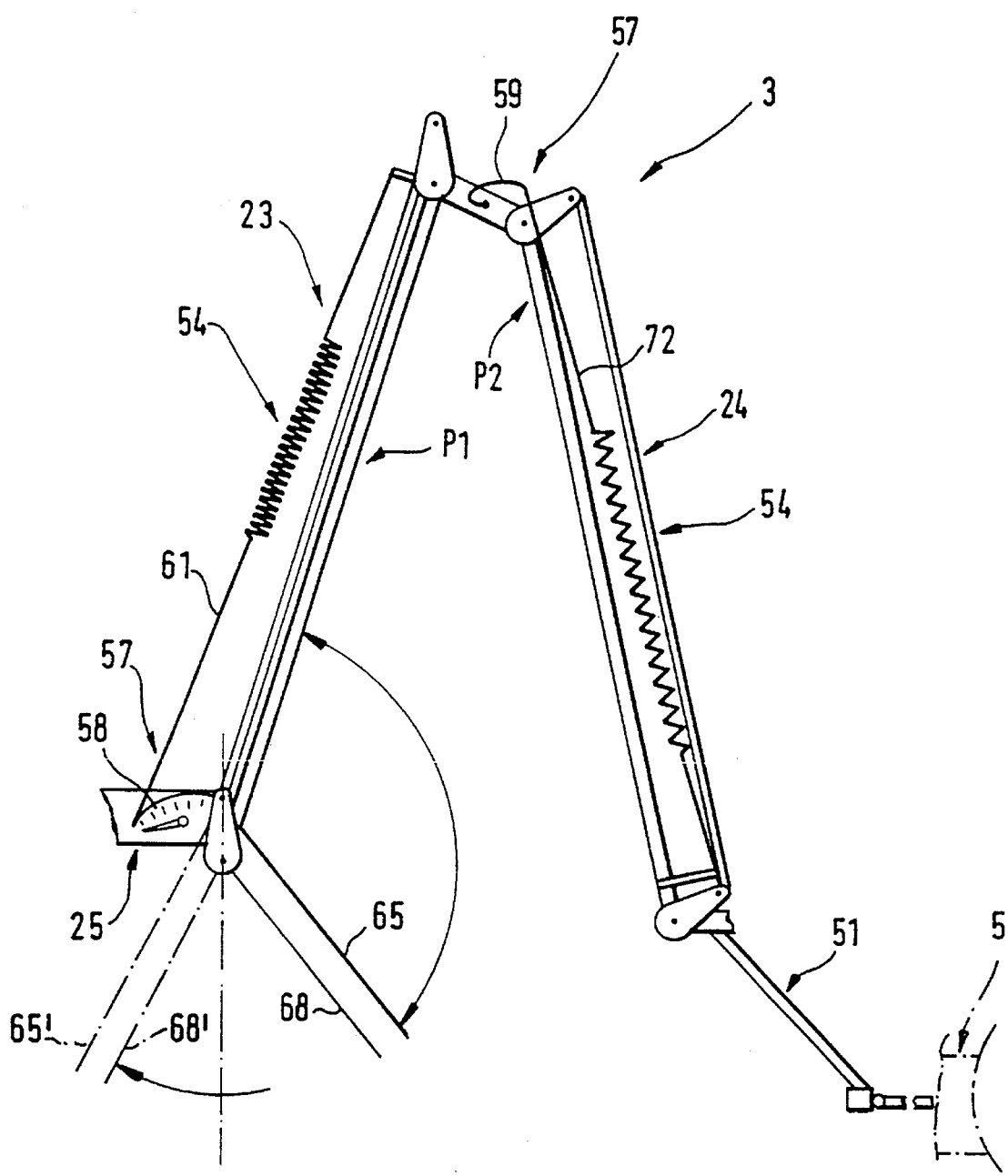
FIG. 5 schematically and with a side view illustrates said parallelogram device, whereby a portion thereof is set in an upwardly directed position and another portion in downwardly directed position.
Figure 6:
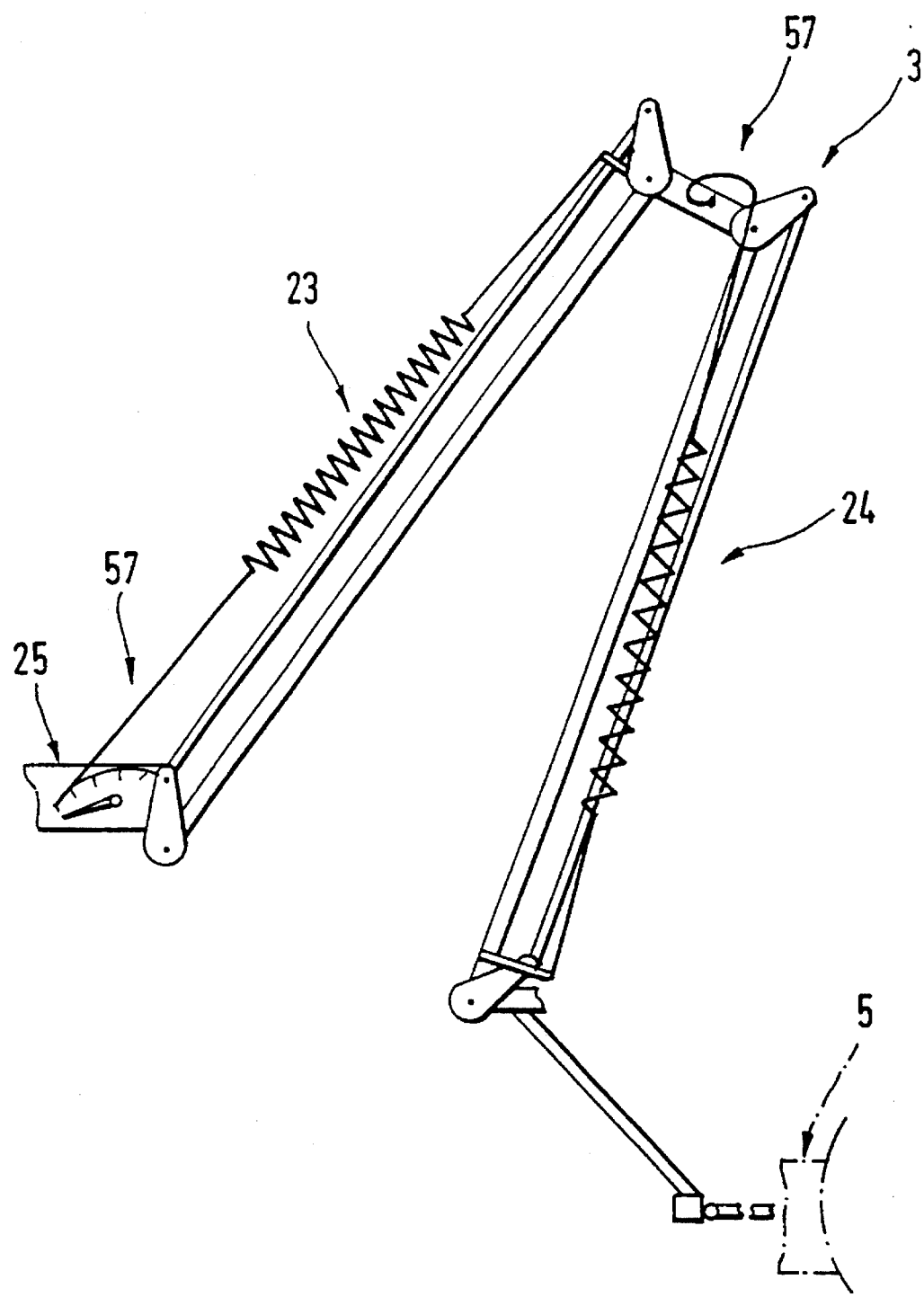
FIG. 6 schematically and with a side view illustrates said parallelogram device having a portion moved somewhat downwards from the position in FIG. 5, while the other member is moved more inwardly from the position of FIG. 5.
Figure 7:
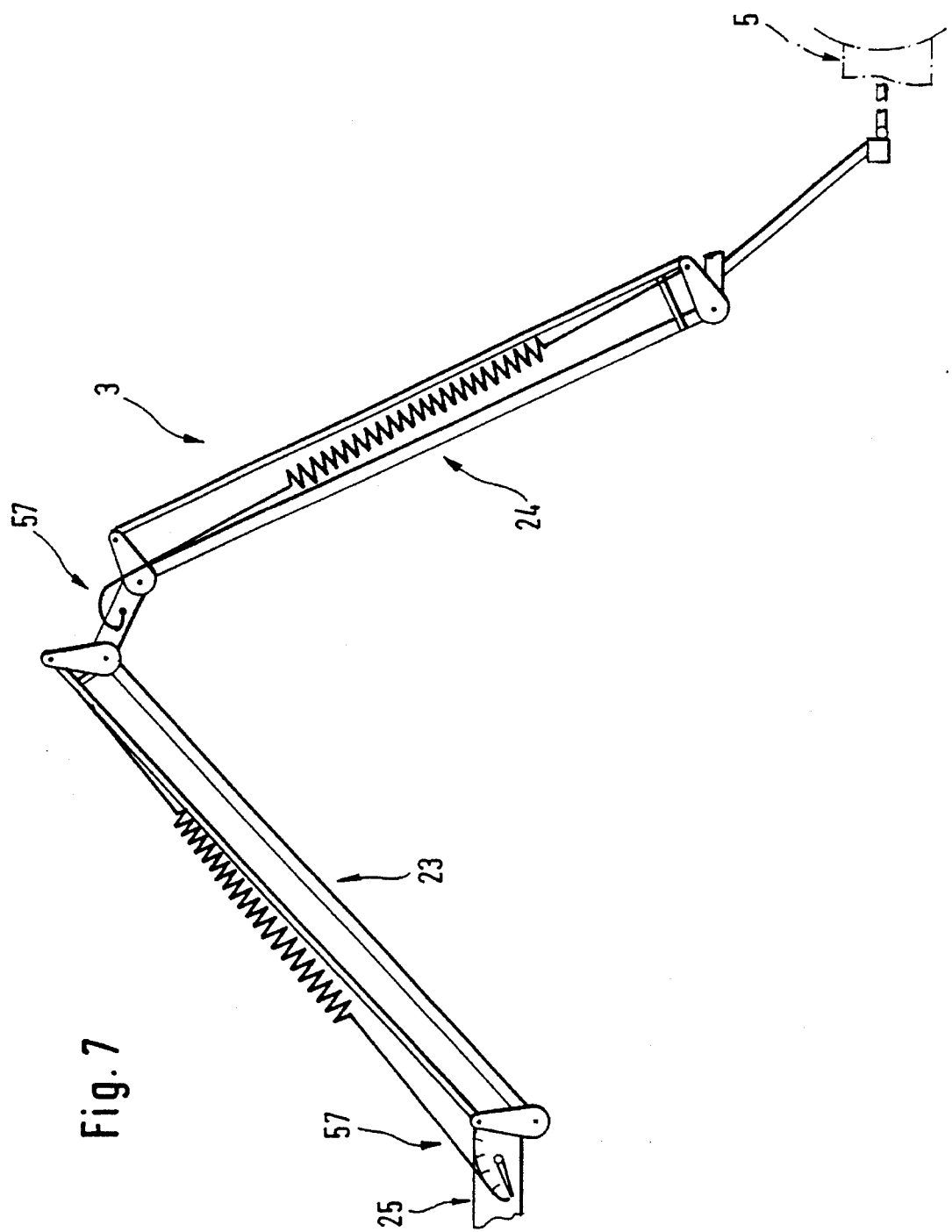
FIG. 7 schematically and with a side view illustrates said parallelogram device having one member moved somewhat downwards from the position of FIG. 6 and the other member moved somewhat outwards from the position of FIG. 6.

The fore part of the tension spring 55 is mounted directly or indirectly on the pivoting arm 33 and on the rear part thereof there is provided a flexible fixing means 61, e.g. a steel wire or similar. The flexible fixing means 61 engages the compensating curve 60 and extends from a fix point 62 located such that the flexible fixing means 61 always engages at least rear portions 63 of the compensating curve 60. The fix point 62 can e.g. be located under the compensating curve 60. The compensating curve 60 is formed and located such that the flexible fixing means 61 engages its rear portions when the first arm 23 is in an upwardly pivoted position (see FIG. 5, position 66). When the first arm 23 is pivoted or moved downwards from this position, the flexible fixing means 61 will roll forward onto the compensating curve 60 more and more, whereby the tension and point of action of the tension spring 55 is altered so that total balancing of the first arm 23 and members provided thereon is achieved in substantially all positions of said arm 23. In a reversed manner, the flexible fixing means 61 will roll backwards and off the compensating curve 60 more and more when the first arm 23 is pivoted upwards.

Figure 4:
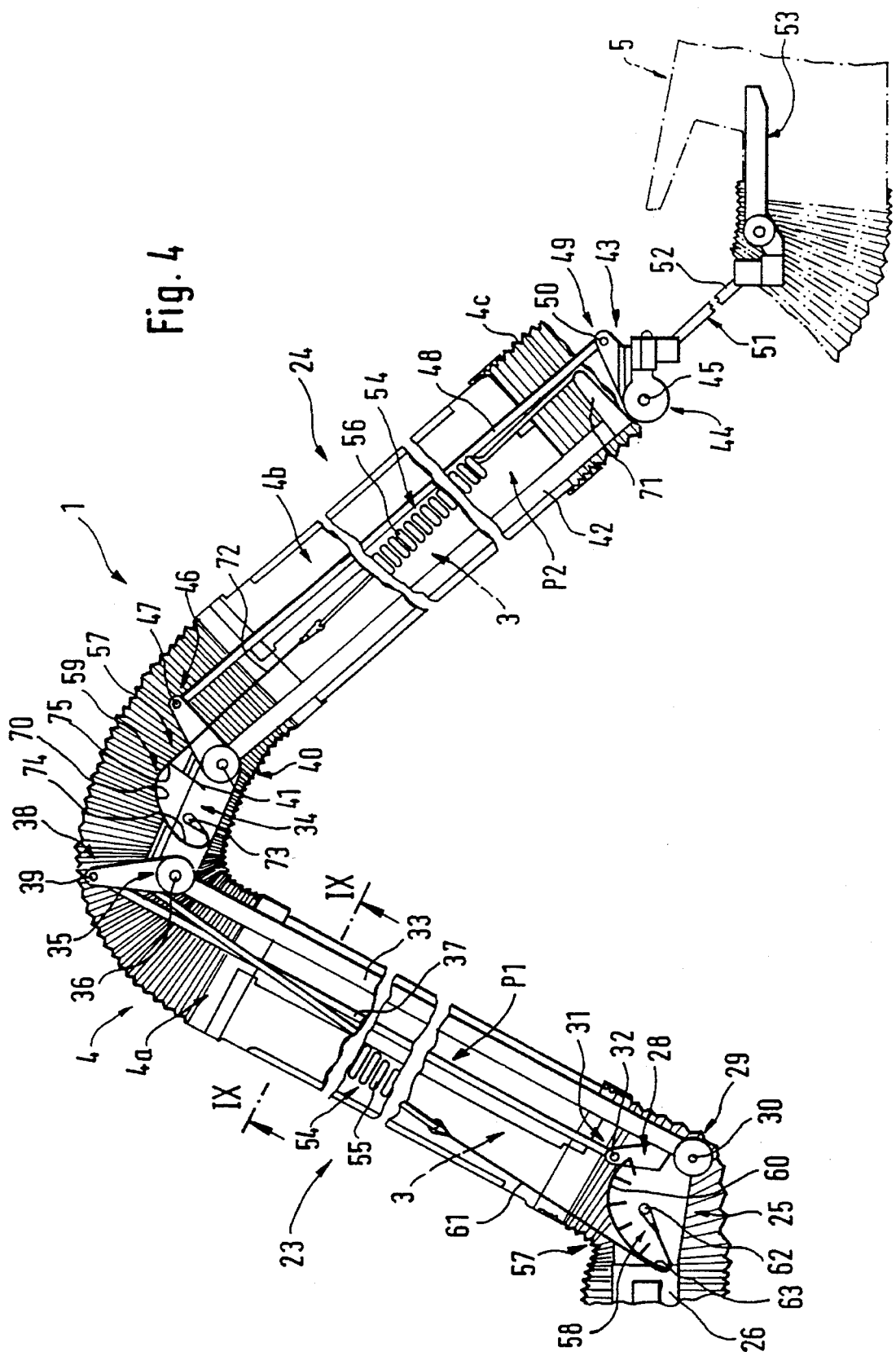
FIG. 4 is a side view showing two arms forming part of the adjustable device according to the invention, whereby obscuring members are removed such that a parallelogram device forming part of said arms can be seen.

The compensating curve 60 is preferably convex in shape and eccentric relative to the centre thereof and its rear portions 63 are preferably located at such a distance behind a vertical plane 67 (see FIG. 5) through the horizontal link shaft 30 of the pivoting arm 33 that the flexible fixing means 61 can move inside the passage 4c from positions adjacent the upper side thereof (see e.g. FIG. 4) in a direction downwards in the passage 4c when the first arm 23 is pivoted downwards from an upwardly pivoted position. The fore portions 64 of the compensating curve 60 are preferably located at or adjacent the vertical plane 67 through the horizontal link shaft 30 of the pivoting arm 33, whereby the flexible fixing means 61 will extend in a position 65 (see FIG. 5) when the first arm 23 is pivoted downwards to a position 68. The arm 23 can eventually be constructed so that said arm can be pivoted downwards beyond the vertical plane 67 to a position 68', whereby the flexible fixing means is located in position 65'.

Figure 8:
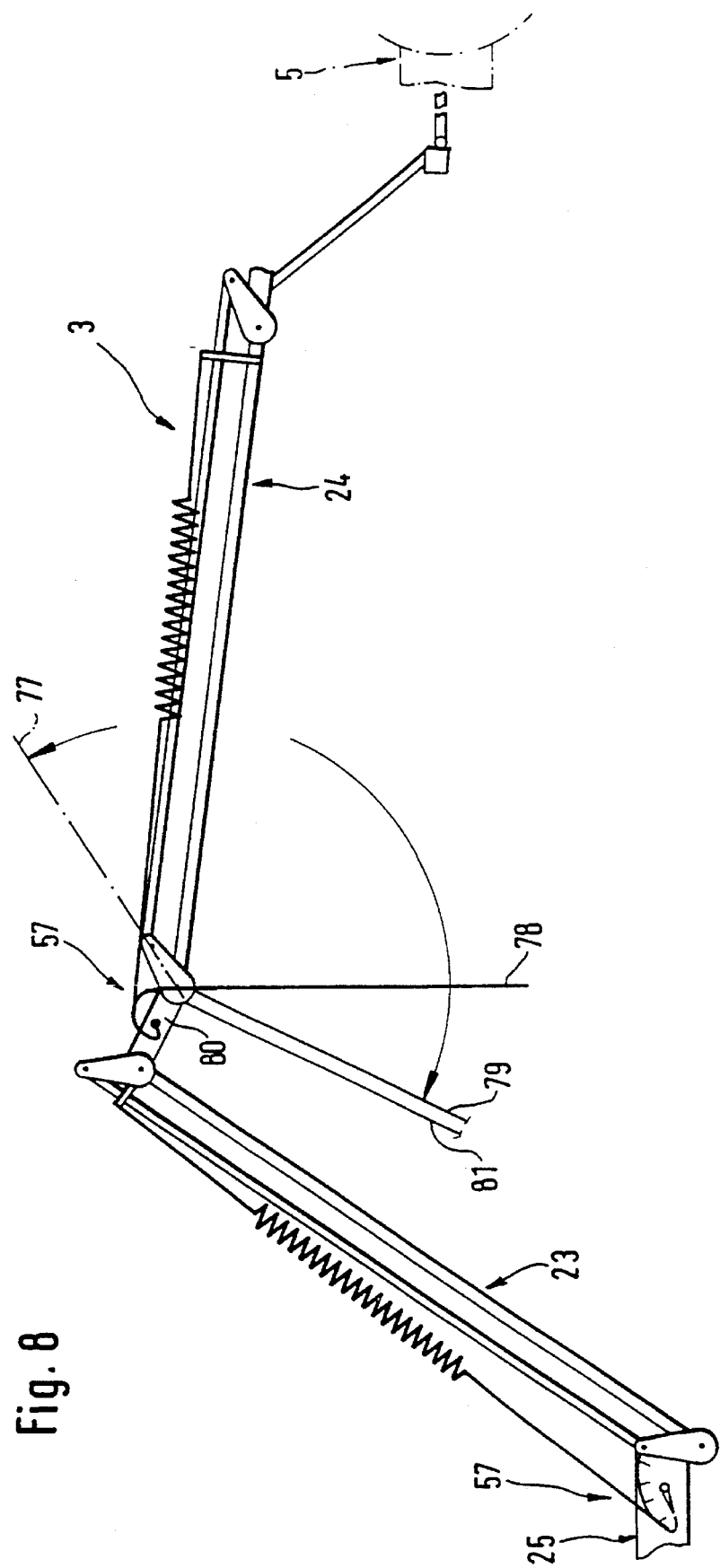
FIG. 8 schematically and with a side view illustrates said parallelogram device wherein one member is moved somewhat upwards from the position in FIG. 7, while the other member is moved substantially outwards from the position in FIG. 7.

The second compensating means 59 of the compensating device 67 preferably has a convex and relative to its centre eccentric shape. The second compensating means 59, its flexible fixing means 72 and the second tension spring 56 are also, seen from above, preferably laterally displaced relative to the portion P2 of the parallelogram device in such a way that said flexible fixing means 72 and tension spring 56 can move beside said portion P2 of the parallelogram device, whereby said flexible fixing means 72 may pass beside said portion P2 of said parallelogram device and its links 40, 46 on the rear link means 34 in order to permit downward pivot or movement of the second arm 24 from the upwardly directed position 77 to a downwardly directed position 79 (see FIG. 8). While there is a free space 80 beneath the fore portions 75 of the compensating curve 70, the flexible fixing means 72 may pass freely downwards through said space and e.g. be set in the downwardly directed position 79 without the compensation curve 70 being in the way. In a reversed manner, the flexible fixing means 72 can move upwards beyond the link 41 when the other arm again is pivoted or moved upwards from the position 79. The fore part of the tension spring can be mounted, seen from the side, about in the middle of the passage 4c on an attachment 71 which is provided at the front of the pivoting arm 42. This attachment 71 is adapted to permit fastening of the fore part of the tension spring 56 in such a way that the force producing means 54 does not come in contact with the passage 4c when the arm 24 is moved.

Figure 9:
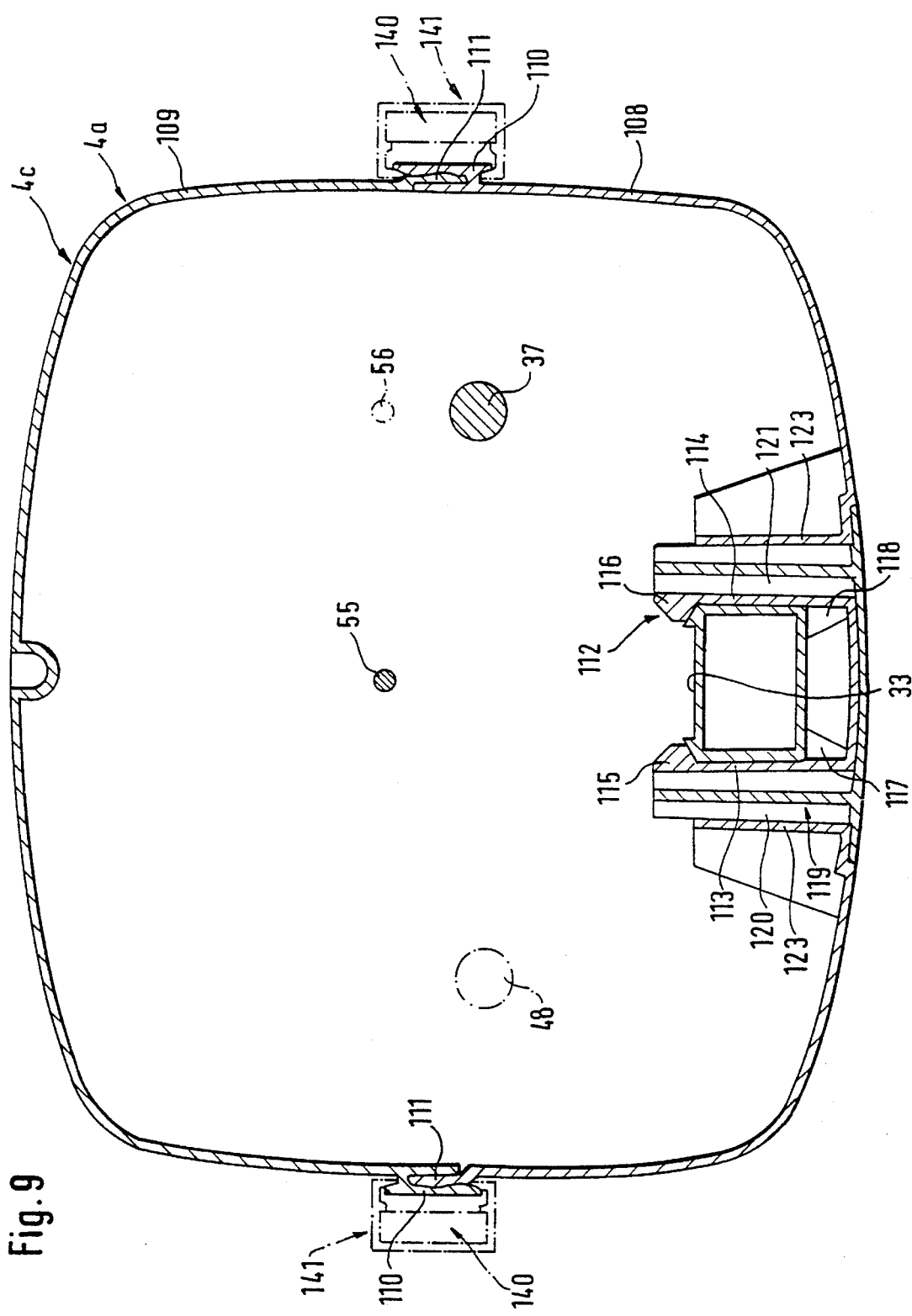
FIG. 9 is a section along line IX—IX in FIG. 4.

FIG. 9 illustrates how the parallel guide bar 37 in the first arm 23, seen from above, is laterally displaced relative to the pivoting arm 33. It is also shown that the tension spring 55 is placed right above the pivoting arm 33.

FIG. 9 further illustrates with dashed and dotted lines that the parallel guide bar 48 in the second arm 24, seen from above, is laterally displaced relative to the pivoting arm 42. It is also shown with dashed and dotted lines that the tension spring 56 is laterally displaced relative to the pivoting arm 42 and furthermore, the parallel guide bar 48 and tension spring 56 are located on both sides of a vertical centre line through said pivoting arm 42. Hereby, the second arm 24 can without hindrance be pivoted or moved to said downwardly directed position 79 (see FIG. 8). On the lower link 44 of the second arm 24 there is provided a fixing means 82 for the outer arm 51 and this fixing means permits pivoting of said outer arm about a vertical axis 83. The outer arm 51 extends obliquely downwards from the fixing means 82 and the bracket 53 is mounted on an outer end portion 52 in such manner that said bracket is pivotable about a vertical shaft 84.

Since the outer arm 51 and bracket 53 are mounted as described, said bracket and thus, the hood 5 can be swung sideways or laterally relative to the second arm 24. The parallelogram device P1, P2 ensures that the bracket 53 and thus, the hood 5 maintain a predetermined orientation relative to the horizontal plane when the arms 23 and/or 24 are pivoted or moved vertically.

The bracket 53 comprises a member 85 provided on the outer arm 51 and an anchor member 86 for anchoring the hood 5. The anchor member 86 is pivotable about a horizontal axis 87 relative to the member 85 mounted on the outer arm 51, whereby the hood 5 when required can be tilted upwards/downwards relative to said outer arm 51.

The outer arm 51 is preferably not articulated between the vertical axes 83, 84 and the hood 5 is eventually pivotally mounted on the anchor member 86 so that it can pivot about a longitudinal axis 88 thereto.

The hood 5 comprises a base hood 89 with a recess 90 permitting threading of said base hood 89 onto the anchor member 86 of the bracket 53. The base hood 89 can be snapped onto the anchor member 86 or attached thereto in another way. The base hood 89 is adapted to define an end opening 91 to the passage 4c and it may include a damper 92 for controlling the gasflow therethrough. The base hood 89 is provided with a handle 93 for manoeuvring said base hood and said handle has a space 94 with a lamp 95. Since the lamp 95 is located in the space 94 in the maneuvering handle 93, it is achieved that said lamp is located beside the gas guiding members of the hood 5. The lamp 95 is adapted to illuminate the work place from which gases shall be sucked and because of its position it is not situated directly in smoke flowing into the hood 5.

The base hood 89 may have a square or substantially square cross section and it may be shaped for connection of an extension hose, an extension pipe or any other additional or supplementary unit (not shown).

Figure 15:
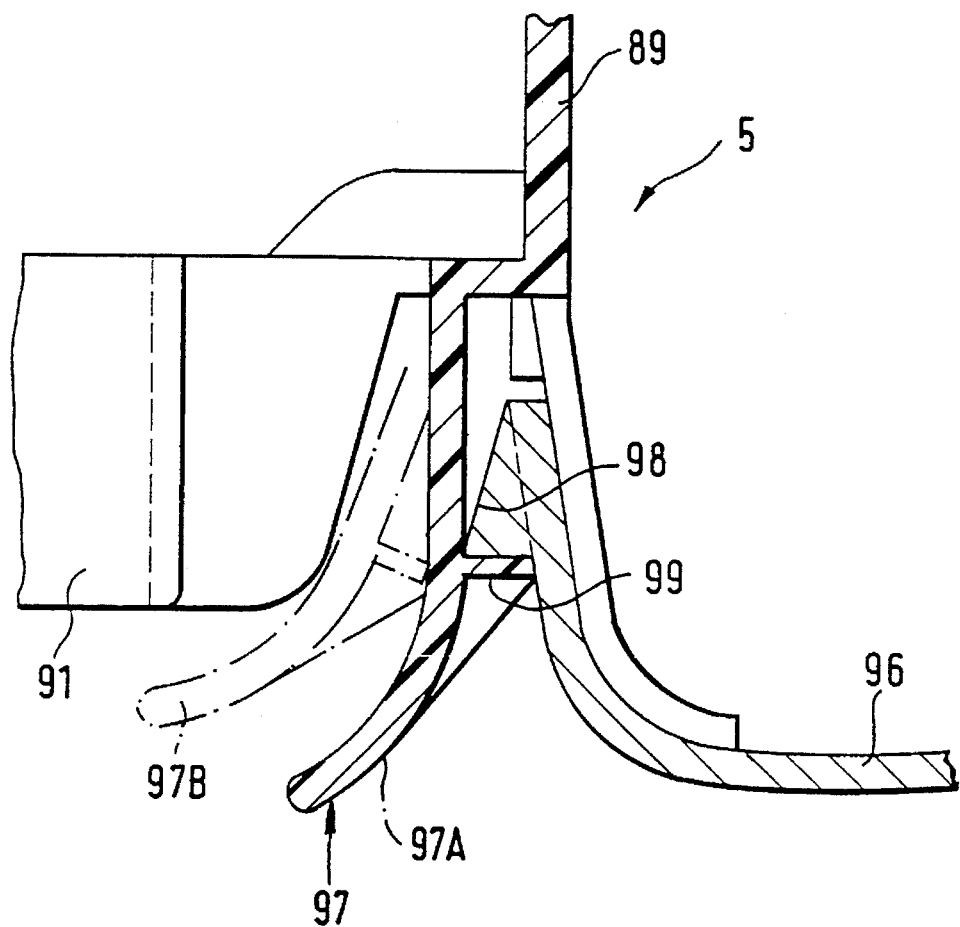
FIG. 15 is a section XV—XV in FIG. 14 through an anchoring device for a flange forming part of the hood of FIG. 13.
Figure 16:
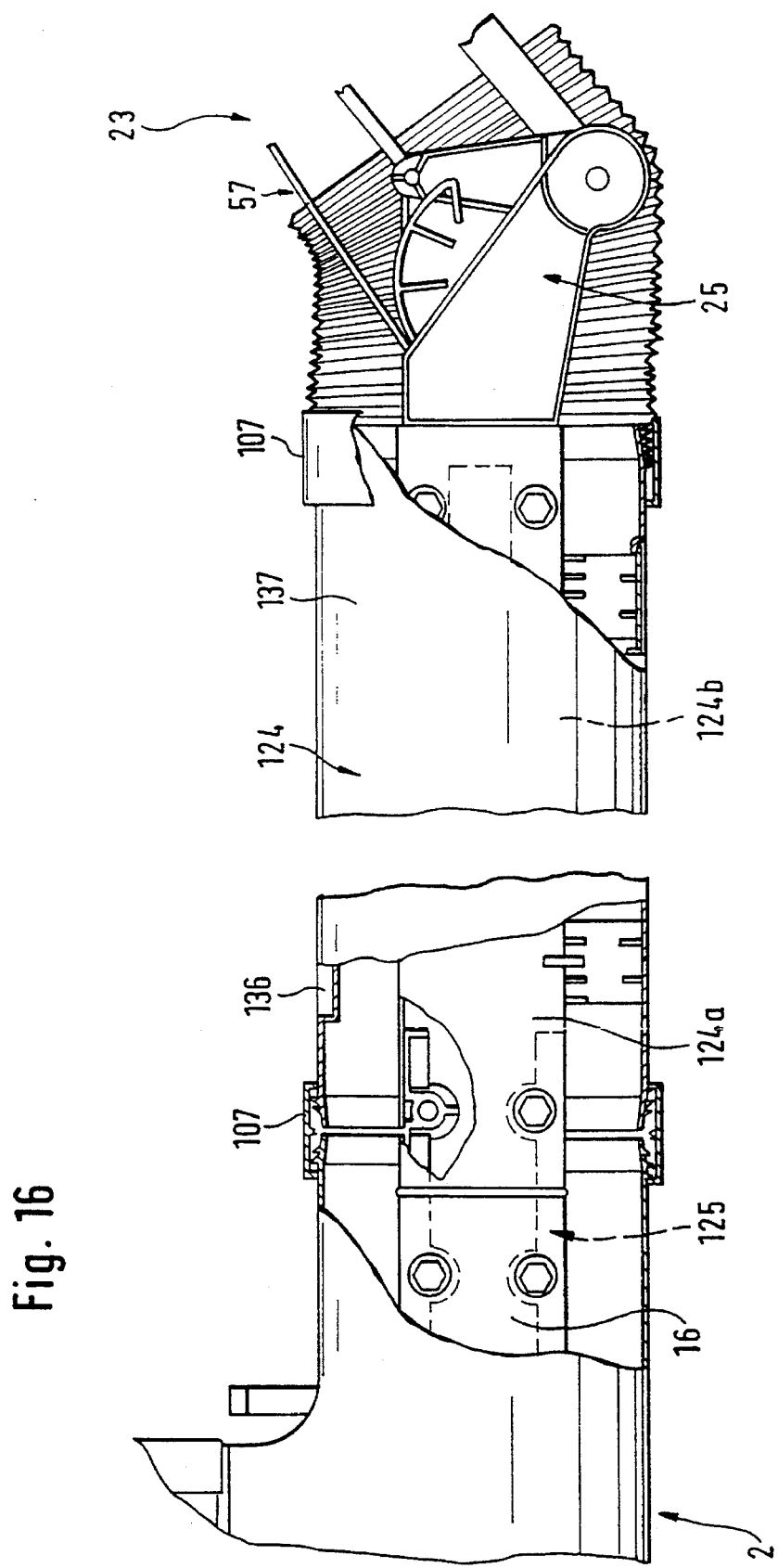
FIG. 16 is a side view, partly in section, of members of the extension device in the embodiment of FIG. 2.
Figure 17:
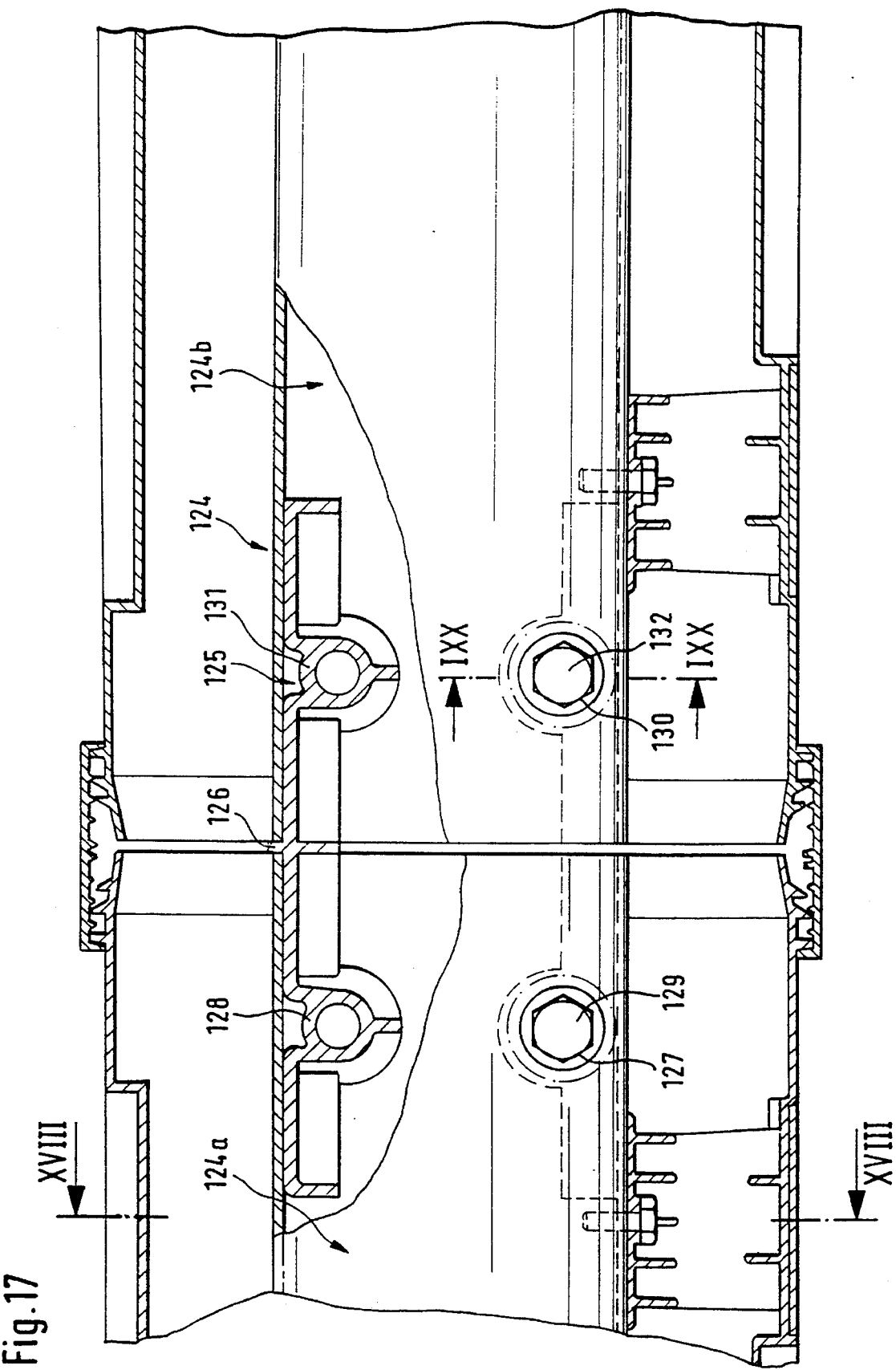
FIG. 17 is a side view, partly in section, of a joint portion of the members illustrated in FIG. 16.
Figure 18:
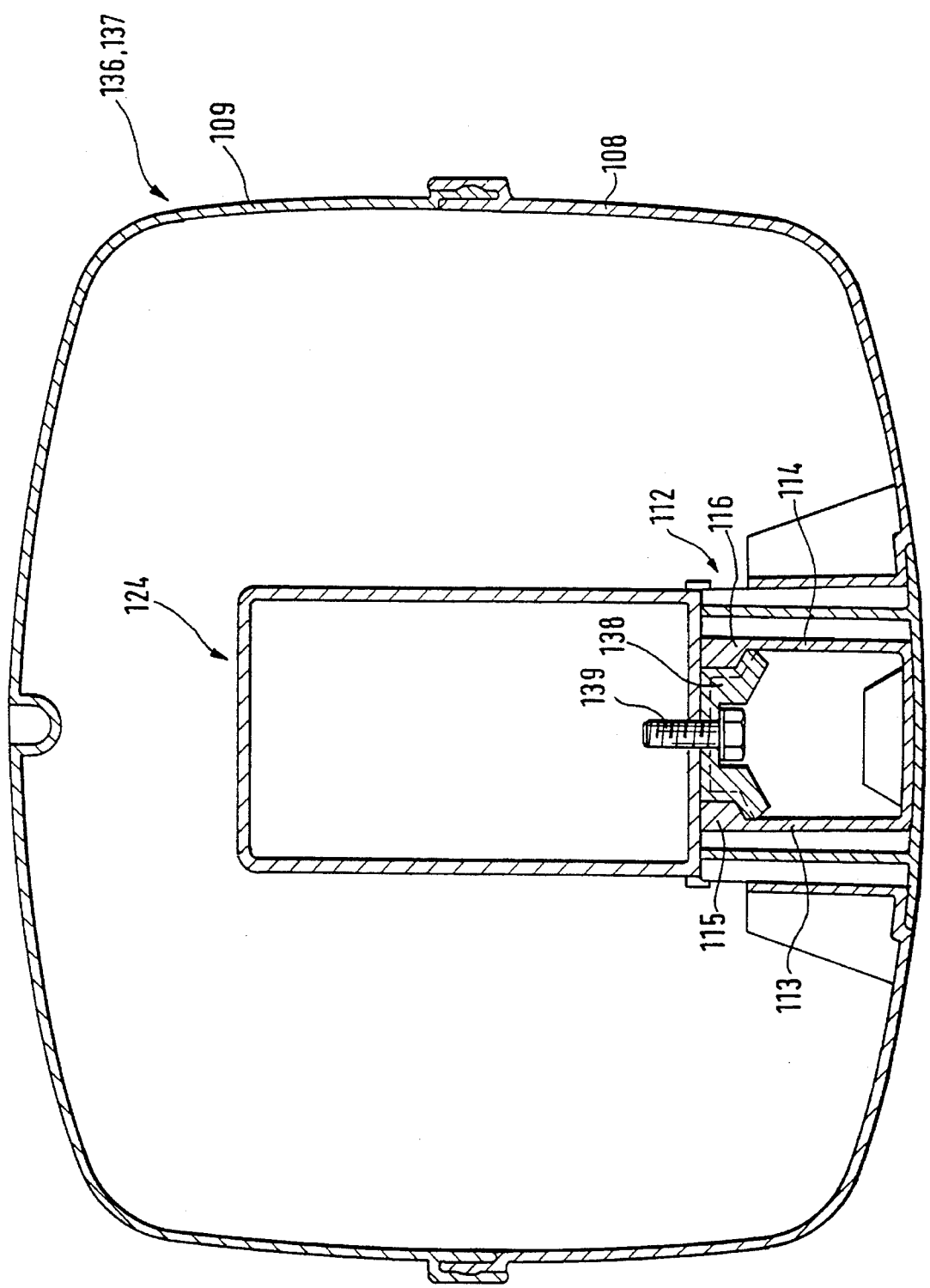
FIG. 18 is a section along line XVIII—XVIII in FIG. 17.
Figure 19:
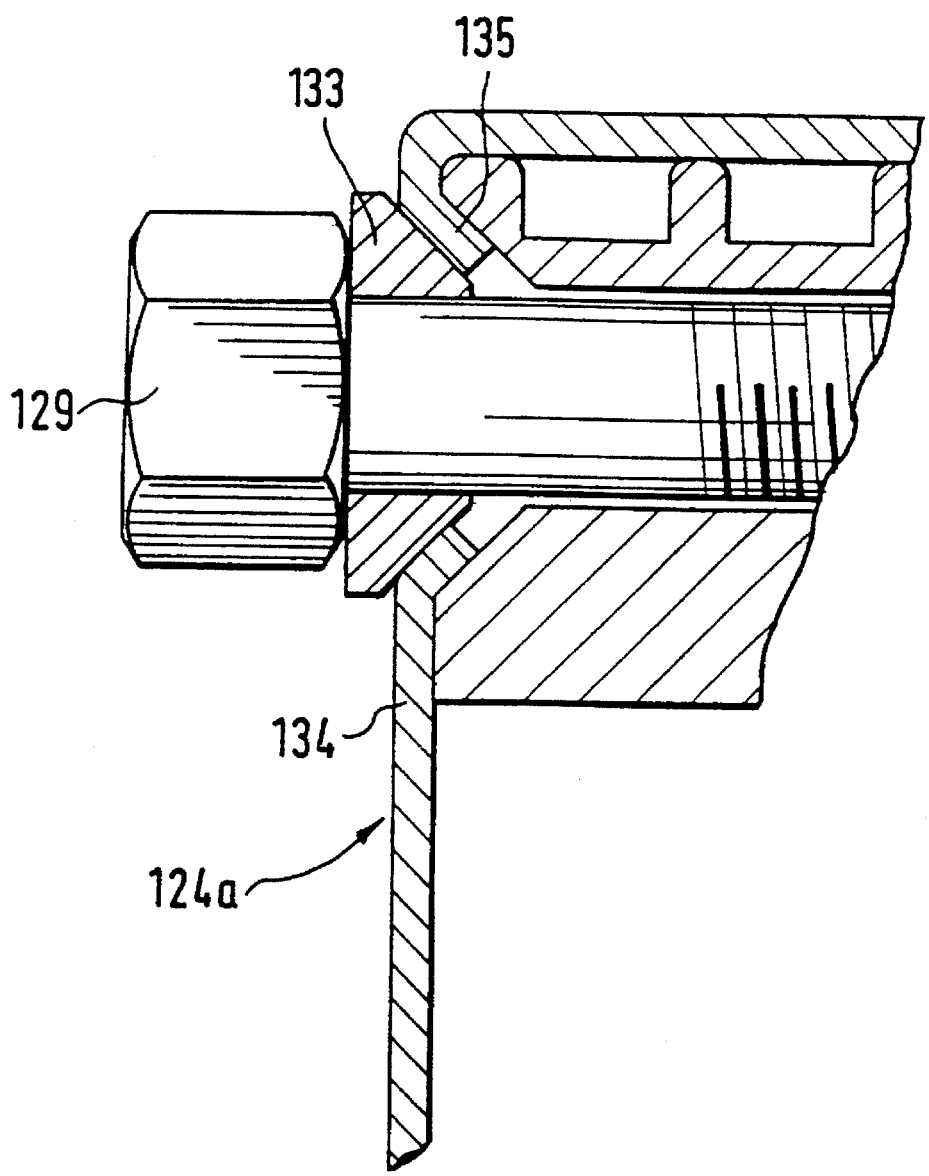
FIG. 19 is a section along line XIX—XIX in FIG. 17.

The hood 5 further comprises a flange 96 which can be mounted on the base hood 89 in such a way that is extends outwardly therefrom. For mounting the flange 96 on the base hood 89, said base hood 89 has two elastic or flexible grip portions 97 at outer parts of the end opening 91. The flange 96 has two corresponding hook portions 98, which means that said flange can be snapped onto the base hood 89 by pressing said flange against said base hood such that said hook portions 98 press the grip portions 97 aside (from position 97A to position 97B in FIG. 15) until said hook portions 98 are located behind a grip tongue 99 on said elastic grip portions 97. Thereafter, the grip portions 97 can spring back to the position 97A such that the grip tongue 99 retains the hook portions 98 and thus, the flange 96 at the base hood 89. The flange 96 can be released by pressing the grip portions 97 aside from position 97A to position 97B by hand, e.g. with the thumb.

The flange 96 preferably has a square circumference, whereby a lower edge 100 is adapted to run in parallel or substantially in parallel with the horizontal plane. Hereby, the lower edge 100 can be placed on a work table so that said lower edge follows said table.

Seen from the side, the flange 96 may have a concave front side 101 and from the front it may be somewhat rectangular and be about twice as wide and high as the base hood 89.

In the passage 4c for gas transport there may be included a flexible hose 102, one end of which is releasably connected with the passage 18 while the other end is releasably connected with a longitudinal pipe 103 which is mounted on the first arm 23. The hose 102 extends above the lower link 29, the first compensating means 58 of the compensating device 57 and the fix point 62 for the flexible fixing means 61. Since the ends of the hose 102 are releaseably connected, it is easy to remove said hose for exposing the first compensating means 58 and the fix point 62 without further interference in the passage 4c. To the pipe 103 there is also releaseably connected one end of a flexible hose 104, the other end of which is releaseably connected with a longitudinal pipe 105 provided on the second arm 24. The hose 104 extends above the intermediate link means 34, the second compensating means 59 of the compensating device 57 and the fix point 73 for the flexible fixing means 72. Since the ends of the hose 104 are releaseably connected, it is easy to remove said hose for exposing the second compensating means 59 and the fix point 73 without further interference in the passage 4c. On the pipe 105 there is also removably provided one end of a hose 106 which is threaded over the outer arm 51 and the other end of which is removably connected with the hood 5.

The end portions of the flexible hoses 102, 104 and 106 are preferably threaded over the longitudinal pipes 103, 105 and the hood 5 and they are fixed by means of hose locks 107.

Each longitudinal pipe 103, 105 preferably has a lower pipe portion 108 and an upper pipe portion 109, which when assembled give the pipe 103, 105 a substantially square cross section with somewhat arcuate sides and corners (see FIG. 9). The pipe portions 108, 109 have grooves 110 in a long side and a tongue 111 at the opposite long side and these grooves and tongues are formed such that said pipe portions can be put together by a snap action. The lower pipe portion 108 further comprises an anchoring device 112 for fixing the pipe portion 108 of the pipe 103 on the pivoting arm 33 and the pipe portion 108 of the pipe 105 on the pivoting arm 42. The anchoring device 112 preferably consists of a snap device having two resilient shanks 113, 114 with inwardly directed tongues 115, 116 and support flanges 117, 118. The lower pipe portion 108 is firmly snapped in position by threading the anchoring device 112 thereof onto the respective pivoting arm 33 and 42 respectively, whereby the shanks 113, 114 are brought to spring outwards. When the tongues 115, 116 have passed the respective pivoting arm 33 and 42 respectively, the shanks 113, 114 can spring back inwardly and said tongues lock said anchoring device at the respective pivoting arm.

After the snap attachment of the pipe portion 108, the support flanges 117, 118 see to that said pipe portion is locked firmly without play. The pipe portion 108 can be locked in the snap position by means of a lock device 119 which is adapted to prevent the shanks 113, 114 from springing or moving outwards. The lock device 119 may comprise a U-shaped member with two shanks 120, 121 which can be inserted into slits or gaps between the resilient shanks 113, 114 of the anchoring device 112 and support flanges 122, 123 on the pipe portion 108 located beside said shanks.

Figure 2:
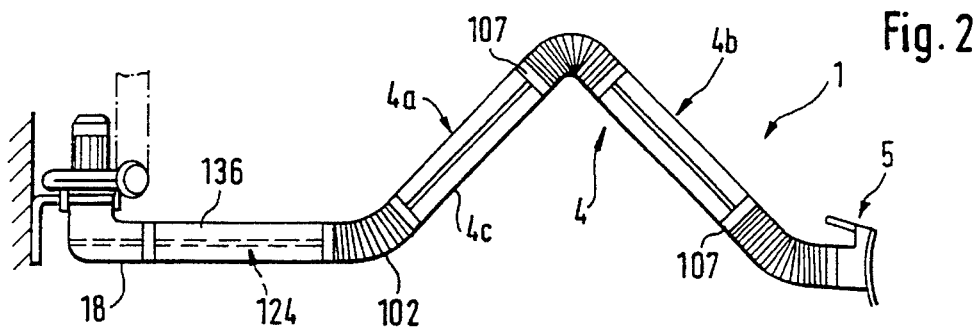
FIG. 2 is a side view of a first alternative embodiment of the adjustable conduit members are provided on an extension device.
Figure 3:
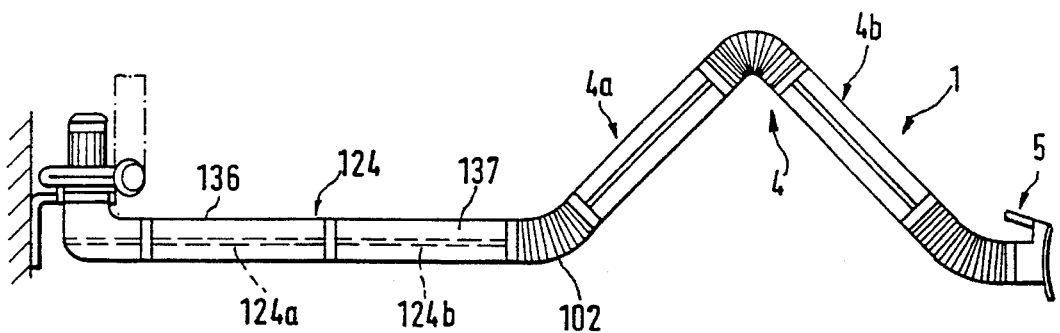
FIG. 3 is a side view of a second alternative embodiment of the adjustable device of the invention, whereby two adjustable conduit members are provided on a longer extension device.

The rear link means 25 may be connected directly with the bracket 16 (as in FIGS. 1 and 10) or indirectly through an extension device preferably comprising at least one beam 124 which may consist of one member (FIG. 2) or two members 124a, 124b (FIG. 3).

In order to connect the beam 124 with the bracket 16 and/or connect the two members 124a, 124b to a beam 124, one can use an interior coupling piece or connector 125 which is designed such that the members to be connected are drawn in a direction towards each other until their edges engage each other with pressure or engage an intermediate portion 126 of said interior connector 125, whereafter said members are held in these positions.

In order to provide this function, the interior connector 125 may have a pair of apertures or holes 127 and 128, which holes are adapted to receive bolts 129 that are threaded through holes in one of the members, e.g. the member 124a, to be connected. The interior connector 125 may have a further pair of holes 130 and 131 for bolts 132 which are threaded through holes in the other of said members, e.g. the member 124b, to be connected.

By locating one pair of holes 127, 128 at a somewhat lesser distance from the other pair of holes 130, 131 than the distance between corresponding holes in the members to be connected, when said members are brought together as far as possible, said members can be pressed further against each other by means of the bolts 129, 132.

By positioning a washer 133 for inward flanging under the head of at least one of the bolts 129 and/or 132, inwardly flanged portions 135 can be provided in the wall 134 of the beam, whereby a firm and effective connection or joint is obtained.

A longitudinal pipe 136 (FIG. 2) or several longitudinal pipes 136, 137 (FIG. 3) of the same type as the longitudinal pipes 103, 105 can be mounted on the beam 124 in order to connect the flexible hose 102 with the passage 18. In order to mount these longitudinal pipes 136, 137 on the beam 124, the anchoring device 112 thereof is used such that between its resilient shanks 113, 114 a fixing unit 138 is provided, which is gripping in under the inwardly directed tongues 115, 116. This fixing unit 138 is attached to the beam 124 by a suitable fastening means 139 so that the anchoring device 112 at the top engages the underside of the beam 124.

On the exhaustion and/or supply conduit 4 there may be provided at least one balance-adjusting weight 140 illustrated with dashed and dotted lines in FIG. 9. This balance-adjusting weight 140 is movable by hand to various positions along the conduit 4 e.g. for adjusting eventual changes in weight which might occur after some time due to e.g. fouling of the pipes 103, 105 or for adjusting the force required for manoeuvring said conduit 4.

The balance-adjusting weight 140 is e.g. provided in a cover 141 which is displaceably mounted on the outside of one or more sides of the longitudinal pipe 103 and/or 105. The balance-adjusting weight 140 can e.g. be fixed in the cover 141 by a snap-action. Alternatively, a longitudinal cover can be provided on the pipe 103 and/or 105 and the balance-adjusting weight 140 provided therein accessible from the outside such that said weight can be displaced in the longitudinal direction of said cover and thus, be set in various positions along the pipe 103 and/or 105.

If the conduit members 4a, 4b have parallelogram devices P1, P2, each conduit member may have at least one balance-adjusting weight 140, whereby each conduit member can be balance adjusted separately.

Figure 20:
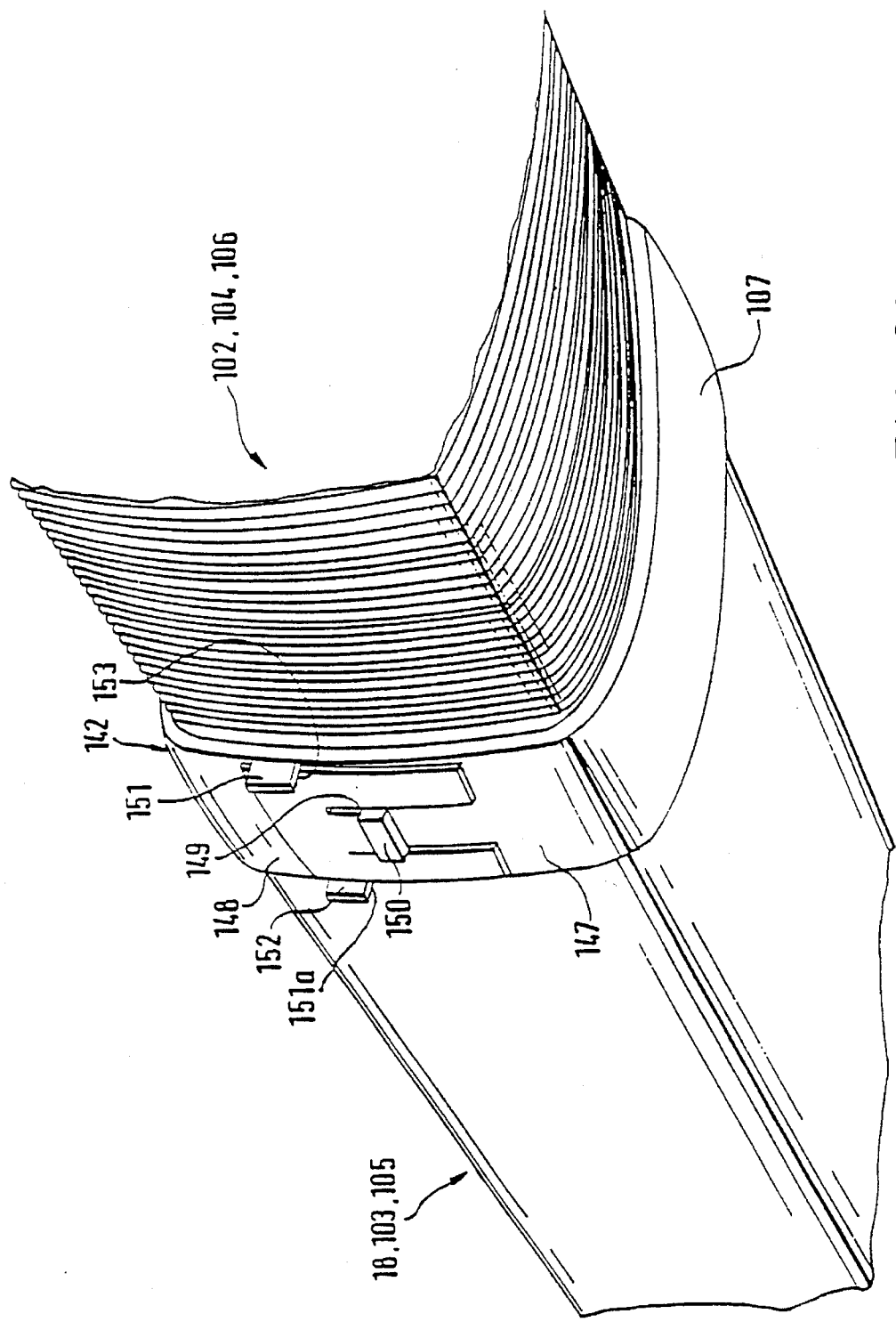
FIG. 20 is a perspective view over a part of the exhaustion and/or supply conduit of the adjustable device according to the invention, said part having a hose lock.
Figure 21:
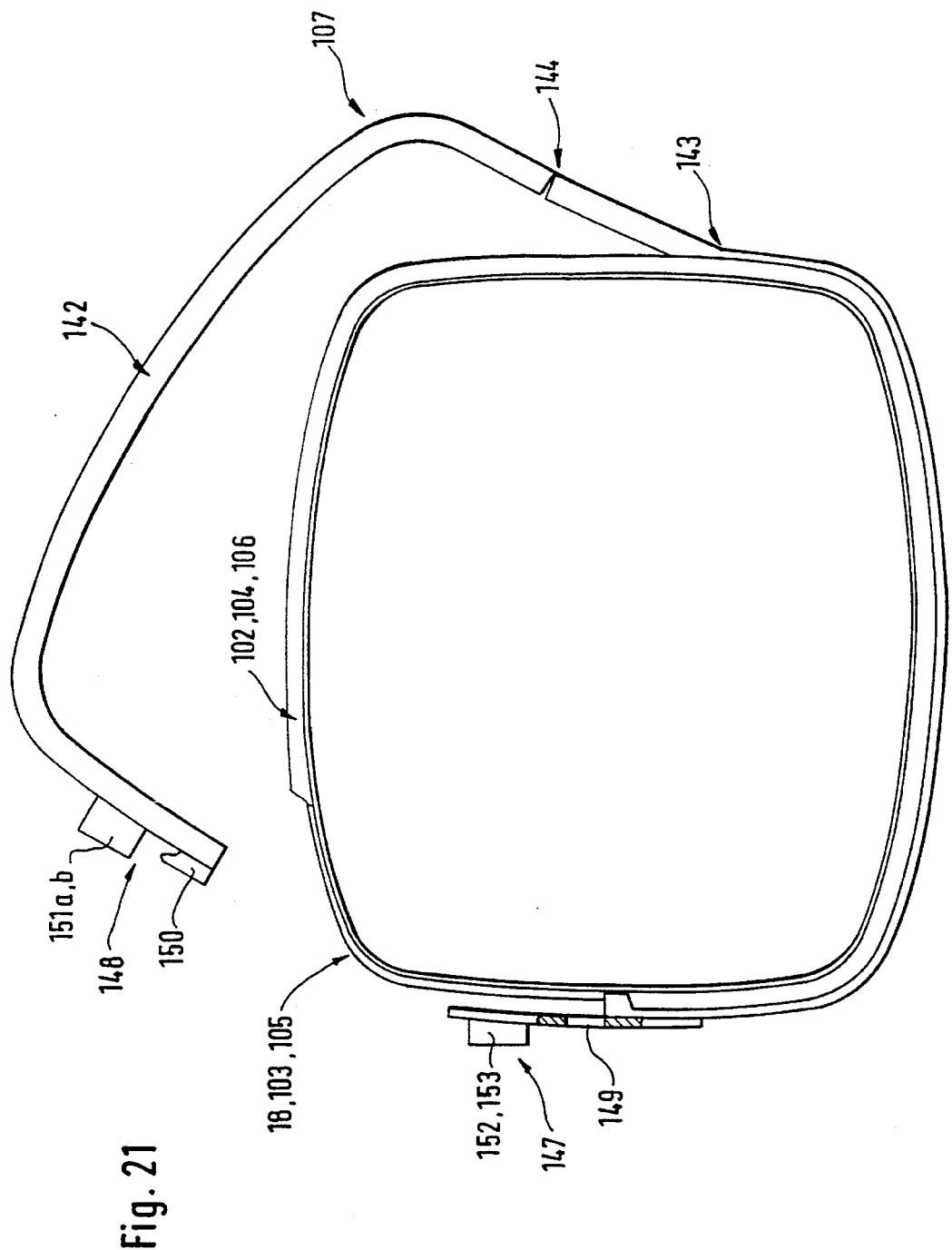
FIG. 21 illustrates the exhaustion and/or supply conduit of FIG. 20 with the hose lock in somewhat open condition.
Figure 22:
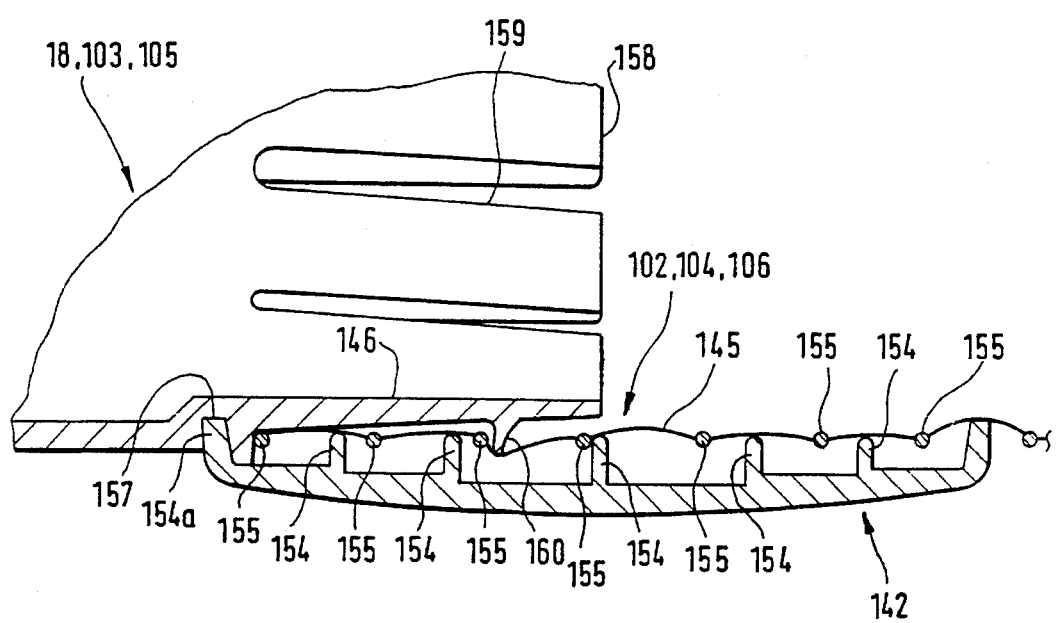
FIG. 22 is a section through the hose lock of FIGS. 20 and 21 and end portions of pipe and hose forming part of the exhaustion and/or supply conduit.

The hose locks 107 may consist of a ring 142 (see FIGS. 20–22) which preferably at two locations is easily bendable to provide hinge-like properties, whereby said ring 142 can be opened for positioning around such part of the conduit 4 wherein the inside of an end portion 145 of the flexible hose 102 and/or 104 and/or 106 engages the outside of an end portion 146 of the pipe 18 and/or 103 and/or 105 and/or eventually the hood 5.

the ring 142 comprises a yoke portion 147 and a hook portion 148, whereby the lock portion of said yoke portion 147 consists of an opening or aperture 149 and the lock portion and said hook portion 148 defines a hook 150 which fits into the opening 149 and defines an eccentric lock. The ring 142 further comprises snap portions 151a and 151b for maintaining the yoke and hook portions 147, 148 in engagement with each other and for preventing, together with members 150 and 149 and guide flanges 152, 153, rotation or distortion of said yoke and hook portions 147, 148 relative to each other when in engagement.

The ring 142 is interiorly adapted to the outer dimensions of the flexible hose 102, 104, 106 and it has inwardly directed hook portions 154 which are adapted to protrude down between spirals 155, defined by a spiral or helical means 156 forming part of the flexible hose 102, 104, 106, such that said hook portions 154 prevent said hose from sliding relative to the ring 142 when said ring is attached to the pipe 18, 103, 105. This function is made possible or improved if the spirals 155 of the hose are not compressible or lack compressible properties.

For fastening the ring 142 on the pipe 18, 103, 105, said pipe is provided with an annular groove 157, into which an inwardly directed flange 154a of the ring 142 can be inserted. This flange 154a is retained in the groove 157 when the ring 142 is locked.

The end portion 146 of the pipe may taper conically towards its outer edge 158, whereby connection of the hose is facilitated and the sealing between hose and pipe improved.

The end portion 146 may be resilient in radial direction, e.g. by providing said end portion with axially extending recesses 159. Furthermore, the end portion 146 may comprise at least one radially outwardly directed, resilient hook 160 for facilitating retainment of the hose at the pipe during mounting or connection.

The invention is not limited to the embodiments described above and shown in the drawings, but may vary within the scope of the following claims.

As examples of not further described or illustrated embodiments which however still lie within the scope of the claims, one can mentioned that the adjustable device 1 also or alternatively can be used for supplying air to locations when this is needed; the device 1 may be mounted in other places than a wall; the fan aggregate 6 can be located in another place than shown.

the balancing device 54 may be mounted in other ways than shown and consist of other members and the compensating device 57 may also be mounted in other ways than illustrated and consist of other parts and members than those shown and described. As an example it can be mentioned that the compensating device may have a compensating means which e.g. is similar to the compensating means 58 and placed in a similar way. Above this compensating means there may also extend a flexible fixing means, but one end thereof is not attached to any tension spring but at the front of the arm 23. Thereafter, the fixing means runs backwards over the compensating means and continues downwards behind said means and includes a balancing device in the shape of a weight or spring which is fastened to the lower end thereof. The size of this weight or the spring force is of course estimated for the required balancing. Another example of compensating device is that a compensating means corresponding with the compensating means 58 can be positioned either on any of the pivoting arms or parallel guide bars on condition that said means maintains its orientation relative to the horizontal plane when the arm in question is moved or pivoted. In order to maintain this orientation, the compensating means can be mounted on a pivoting arm as well as the corresponding parallel guide bar. A further example of a compensating device is a device having at least one compensating motor.

Furthermore, instead of two conduit members 4a, 4b there can be only one conduit member 4a; the passage 4c or similar can be suspended exteriorly on a support arm or similar instead of locating the support arm inside the passage 4c; the conduit device 2 may be of another type and also other members and parts of the device according to the invention, their position and number may vary within the scope of the invention.

It should be noted that the terms "horizontal", "vertical", "upward" and "downward" and variations of these terms as used in the following claims are to be interpreted as providing relative positions and directions. Therefore, these terms are not to be construed as limiting in an absolute sense.

I claim:

1. An adjustable device for exhaustion and supply of gases and gas supported particles, said device comprising:

at least one conduit which is pivotable in at least a vertical direction, at least one force-producing balancing device, including at least one tension spring is provided for balancing the conduit (4), the force-producing balancing device cooperating with a compensating device, including at least one compensating means defining at least one, relative to its centre, eccentric compensating curve and said compensating device also including at least one flexible fixing means through which at least one balancing-force generating means in the force-producing balancing device is fixed, whereby said flexible fixing means engages the compensating curve in such a way that said fixing means by sliding or rolling on and off the compensating curve, is displaced along said compensating curve when the conduit is pivoted or moved in the vertical direction, such that the differences between the balancing force exerted on said conduit by the balancing-force generating means and the force required for balancing said conduit is compensated.

2. An adjustable device according to claim 1,
wherein the conduit comprises a first conduit member which is pivotable in the vertical direction and a second conduit member which is mounted on said first conduit member and also pivotable in the vertical direction and,
wherein the compensating device includes a first compensating members for cooperation with such members of the force-producing balancing device which are adapted to balance the first conduit member, and said compensating device also includes second compensating members for cooperation with such members of said force-producing balancing device which are adapted to balance the second conduit member.

3. An adjustable device according to claim 2, wherein the compensating curve of the compensating means has such a convex and, relative to its centre, eccentric shape, that the differences between the balancing force exerted on the conduit by the force-producing balancing device and the force required for balancing said conduit is compensated by altering the force exerted on said conduit by the balancing-force generating means as well as its point of action on the compensating curve when the flexible fixing means moves along said compensating curve.

4. An adjustable device according to claim 1, wherein the compensating means is arranged such that it maintains its positional orientation relative to a horizontal plane when the conduit is pivoted.

5. An adjustable device according to claim 1,
wherein the compensating means is provided on a link means on which the conduit is pivotally mounted,
the flexible fixing means is fixed on the same link means and
the compensating means and the flexible fixing means are mounted such that said flexible fixing means successively engages ever increasing parts of the compensating curve of said compensating means in a direction from rear portions of said curve towards fore portions thereof when the conduit is pivoted or moved downwards, while said flexible fixing means successively leaves said compensating curve in a direction towards its rear portions when conduit is pivoted upwards.

6. An adjustable device according to claim 1, wherein the compensating means is fixedly provided on a link means on which the conduit is pivotally mounted and the flexible fixing means extends through rear portions of the compensating curve of said compensating means to a fixed fix point on said link means, whereby said fix point is placed such that said flexible fixing means always engages at least rear portions of said compensating curve.

7. An adjustable device according to claim 1, wherein the compensating curve of the compensating means is convex in shape and fore portions of said compensating curve are situated near a plane, passing through a link, in which the conduit is pivotable.

8. An adjustable device according to claim 1, wherein the flexible fixing means is connected with the conduit such that it runs over the compensating curve of the compensating means and the flexible fixing means is also attached to one end portion of a force-producing balancing device including at least one spring means, the other end portion of which is operatively associated with the conduit at a distance from a link in which said conduit is pivotable in the vertical direction.

9. An adjustable device according to claim 1, wherein the compensating device or at least members thereof are laterally displaced relative to members forming part of the conduit such that at least some of the members forming part of said compensating device can move in the vertical direction beside said members conduit when said conduit is pivoted.

10. An adjustable device according to claim 9, wherein at least members (58, 61 and/or 59, 72) forming part of the compensation device are laterally displaced relative to at least one link wherein the conduit (4) is pivotally mounted such that at least any of said members of said compensating device can move in the vertical direction beside said link when said conduit is pivoted.

11. An adjustable device according to claim 9, wherein at least one flexible fixing means forming part of the compensating device, through which force-producing means forming part of the force-producing balancing means are fixed and which cooperates with at least one compensating means and is laterally displaced relative to members forming part of the conduit (4) and relative to at least one link wherein the circuit (4) is pivotally mounted, such that the flexible fixing means can move in the vertical direction beside at least any of said members of said conduit and said link in which said conduit is pivotally mounted.

12. An adjustable device according to claim 1, wherein at least one balancing-force producing means forming part of the force-producing balancing means is laterally displaced relative to members of the conduit (4) such that said balancing-force producing means can be displaced beside said members of said conduit when said conduit is pivoted.

13. An adjustable device according to claim 1,
wherein the conduit comprises a first conduit member which is pivotable in the vertical direction and a second conduit member which is mounted on said first conduit member and also pivotable in the vertical direction, and
wherein the compensating device comprises a first compensating means on the first conduit member and a flexible fixing means engaging a compensation curve on said compensating means and through which a balancing-force producing means for balancing said first conduit member is fixed, and said compensating device comprises a second compensating means for the second conduit member as well as a flexible fixing means engaging a compensating curve on said second compensating means and through which a balancing-force producing means for balancing said second conduit member is fixed.

14. An adjustable device according to claim 13, wherein the first compensating means is mounted on a rear link means on which a link for pivoting the first conduit member is provided and the second compensating means is mounted on an intermediate link means which is provided on said first conduit member and on which a link for pivoting the second conduit member is provided.

15. An adjustable device according to claim 14, wherein the flexible fixing means cooperating with the first compensating means is fixedly mounted on the rear link means and the flexible fixing means cooperating with the second compensating means is fixedly mounted on the intermediate link means.

16. An adjustable device according to claim 1,
wherein the force-producing balancing device is provided inside a passage forming part of the conduit (4) for gas transport, and
wherein the compensating device is also mounted inside the passage for gas transport.

17. An adjustable device according to claim 16, wherein at least one compensating means forming part of the compensating device and a fix point for at least one flexible fixing member which forms part of said compensating device and cooperates with said compensating means and which fixes said force-producing compensating device, are provided inside partially operable parts of the passage for gas transport for enabling exposure of said compensating means and said fix point by opening said parts without interfering with other parts or members of said passage.

18. An adjustable device according to claim 1, wherein the compensating device is mounted inside the passage for gas transport such that at least one flexible fixing means forming part thereof and cooperating with at least one compensating means also forming part of said compensating device, can move inside said passage from positions adjacent the upper side of said passage and downwards in said passage when members of the conduit are pivoted in the downwards direction.

19. An adjustable device according to claim 1, wherein the conduit comprises a support arm which cooperates with the force-producing balancing device and, wherein the compensating device (57) directly or indirectly cooperates with the support arm.

20. An adjustable device according to claim 19, wherein the compensating device and support art are located inside a passage for gas transport forming part of the conduit.

21. An adjustable device according to claim 19, wherein or least members forming part of the compensating device are laterally displaced relative to members of the support arm forming part of the conduit such that said members of the compensating device can move in the vertical direction beside members of the support arm.

22. An adjustable device according to claim 1, wherein the conduit comprises a support arm including at least one parallelogram device in order to ensure that outer parts of said conduit maintain a predetermined orientation relative to the horizontal plane during pivoting of said conduit and wherein the force-producing balancing device comprises at least one spring means, and the compensating device compensates for differences between the force requirement of the parallelogram device and the characteristic of the spring means.

23. An adjustable device according to claim 22, wherein parts of the parallelogram device forming part of the first conduit member are provided to permit that at least one member of the members of the compensating device which are adapted to cooperate with the second conduit member, maintains a predetermined orientation relative to the horizontal plane when said first conduit member pivots in the vertical direction.

24. An adjustable device according to claim 23, wherein the member which by the parts of the parallelogram device forming part of the first conduit member maintains a predetermined orientation relative to the horizontal plane when said first conduit member is pivoted in the vertical direction, comprising a compensating means with a compensating curve which is engaged by a flexible fixing means forming part of the compensating device.

25. An adjustable device according to claim 1, wherein the members of the conduit which comprise the compensating device are mounted on an outer arm such that said arm is pivotable about a vertical axis, a bracket for a hood is provided on an outer end portion of said outer arm such that said bracket is pivotable about a vertical axis relative to said outer arm, and the bracket includes an anchor member for the hood, said anchor member is connected with a member provided on the outer arm such that said anchor member is pivotable about a horizontal axis relative to said member on said outer arm.

26. An adjustable device according to claim 25, wherein the outer arm is inarticulate between the vertical axes.

27. An adjustable device according to claim 25, wherein the hood is pivotally mounted on the anchor member such that it can pivot about a longitudinal axis thereto.

28. An adjustable device according to claim 1, wherein said conduit comprises at least one passage for gas transport, which passage includes at least one longitudinal pipe, and the longitudinal pipe, comprises a lower and an upper pipe portion, whereby this lower and/or upper pipe portion through an anchoring device can be fixed on a pivoting arm forming part of the conduit in such a way that said pivoting arm is situated inside said longitudinal pipe.

29. An adjustable device according to claim 28, wherein at least one of the pipe portions comprises an anchoring device, in the shape of a snap device permitting snapping of said pipe portion onto the pivoting arm and the snap device can be locked by means of a lock device which is adapted to ensure that said snap device maintains its grip on the pivoting arm.

30. An adjustable device according to claim 28, wherein the anchoring device is mounted on the lower pipe portion such that this pipe portion can be mounted on the pivoting arm.

31. An adjustable device according to claim 28, wherein the anchoring device is designed such that it also permits mounting of the lower and upper pipe portion on an extension device, including at least one beam through which at least one pivoting arm can be mounted.

32. An adjustable device according to claim 28, wherein the longitudinal pipe has a substantially square cross section and, wherein the sides and corners are preferably somewhat arcuate and to at least one such longitudinal pipe there is connected a flexible hose with a square cross section and which is threaded onto said longitudinal pipe and fixed thereto through a hose clamp.

33. An adjustable device according to claim 28, wherein at least one force-producing balancing device is provided for balancing the conduit and wherein said exhaustion and/or supply conduit includes a hood, and wherein the hood comprises a base hood which is adapted to define an end opening to a passage for gas transport, which passage forms part of the conduit, and that the hood further comprises a flange which can be mounted on the base hood in such a way that it defines a screen to said base hood.

34. An adjustable device according to claim 33, wherein a handle for manoeuvering the hood is provided on the base hood.

35. An adjustable device according to claim 34, wherein a lamp is mounted in the manoeuvering handle in such a way that said lamp is situated beside gas guiding members of the hood.

36. An adjustable device according to claim 34, wherein the base hood has substantially the same cross sectional shape and size as the portions of the passage for gas transport connected therewith, and the cross section of said base hood preferably is substantially square.

37. An adjustable device according to claim 33, wherein the flange can be snapped onto the base hood.

38. An adjustable device according to claim 33, wherein the flange has a square cross section and, a lower edge thereof is adapted to run substantially in parallel with the horizontal plane.

39. An adjustable device according to claim 33, wherein the flange has a somewhat concave front side.

40. An adjustable device according to claim 33, wherein the base hood is designed to permit connection of any extension unit.

41. An adjustable device according to claim 1, wherein said conduit includes at least one passage for gas transport, which passage has at least one longitudinal pipe, and the longitudinal pipe comprises a lower and an upper pipe portion, whereby this lower and upper pipe portion through an anchoring device can be fixed on at least one extension device forming part of the conduit in such a way that said extension device is situated inside said longitudinal pipe.

42. An adjustable device according to claim 41, wherein the anchoring device defines a snap device, preferably in the shape of resilient shanks which permit snapping of the pipe portion onto at least one pivoting arm forming part of the conduit.

43. An adjustable device according to claim 1, wherein said conduit includes at least one extension device, and the extension device is connectable with other members in the conduit and with various members forming part of said extension device by means of a connector which during mounting permits drawing or pulling of said extension device and said members and said various members of said extension device against each other and keeping or holding them in joined positions.

44. An adjustable device according to claim 1, wherein at least one balancing-adjusting weight is mounted on the conduit, said weight being manually displaceable along said conduit.

45. An adjustable device according to claim 44, wherein the balancing-adjusting weight is mounted displaceable in the longitudinal direction on the conduit.

46. An adjustable device according to claim 44, wherein the conduit includes at least one passage for gas transport, which gas passage comprises at least one longitudinal pipe and the balance-adjusting weight is provided on the outside of the longitudinal pipe and movably displaced in a longitudinal direction, to various locations along said longitudinal pipe.

47. An adjustable device according to claim 44, wherein the conduit (4) comprises a first and a second conduit member which both are pivotable in the vertical direction and wherein each conduit member includes at least one parallelogram device in order to ensure that outer parts of said conduit maintain a predetermined orientation relative to the horizontal plane during pivoting of said conduit, and each conduit member comprises at least one balance-adjusting weight.

48. An adjustable device according to claim 44, wherein the balance-adjusting weight is provided in a longitudinal cover which is disposable on the conduit.

49. An adjustable device according to claim 1, wherein said conduit includes at least one passage for gas transport, which passage comprises at least one longitudinal pipe to which a flexible hose with at least one helical means is connected, said helical means defining spirals included in said flexible hose, wherein the flexible hose is locked in said longitudinal pipe by means of at least one hose lock having hook portions which are adapted to protrude down between the spirals of the helical means in such a way that said hook portions prevent said flexible hose from sliding relative to said hose lock and that the hose lock can be fixed on the longitudinal pipe.

50. An adjustable device according to claim 49, wherein the end portion of the pipe, at which the flexible hose can be locked by means of the hose lock, tapers conically towards its outer edge.

51. An adjustable device according to claim 49, wherein the end portion of the pipe, at which the flexible hose can be locked by means of the hose lock, is resilient in radial direction, and the end portion has an outwardly directed, resilient hook to permit retainment of the flexible hose during mounting.

52. An adjustable device according to claim 49, wherein the hose lock has the shape of a ring which can be opening and which in the open condition can be put around such an end portion of the flexible hose which is to be locked at the pipe, and the ring comprises a yoke portion and a hook portion which can be locked to each other, and the size of the ring is adapted to the size of the flexible hose.

53. An adjustable device according to claim 52, wherein the yoke and hook portions of the ring are provided with at least one lock portion, for locking said yoke and hook portions to each other and the ring also comprises at least one snap portion for keeping the yoke and hook portions in engagement with each other.

* * * * *